United States Patent
Wiegman et al.

(10) Patent No.: US 11,557,811 B1
(45) Date of Patent: Jan. 17, 2023

(54) SYSTEM FOR BATTERY ENVIRONMENT MANAGEMENT IN AN ELECTRIC AIRCRAFT AND A METHOD FOR ITS USE

(71) Applicant: BETA AIR, LLC, South Burlington, VT (US)

(72) Inventors: Nathan William Joseph Wiegman, Williston, VT (US); Sean Donovan, Richmond, VT (US); Sam Wagner, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/701,780

(22) Filed: Mar. 23, 2022

(51) Int. Cl.
  *H01M 50/30*  (2021.01)
  *H01M 50/249* (2021.01)
  *H01M 10/0525* (2010.01)
  *H01M 50/317* (2021.01)
  *H01M 50/211* (2021.01)

(52) U.S. Cl.
  CPC ..... *H01M 50/394* (2021.01); *H01M 10/0525* (2013.01); *H01M 50/211* (2021.01); *H01M 50/249* (2021.01); *H01M 50/317* (2021.01); *H01M 2220/20* (2013.01)

(58) Field of Classification Search
  CPC ........... H01M 50/394; H01M 10/0525; H01M 50/211; H01M 50/249; H01M 50/317; H01M 2220/20
  USPC ....................................................... 429/129
  See application file for complete search history.

(56) References Cited

U.S. PATENT DOCUMENTS

| | | | |
|---|---|---|---|
| 7,351,493 B2 | 4/2008 | Uemoto et al. | |
| 7,858,220 B2 | 12/2010 | Shimizu | |
| 9,997,811 B2 | 6/2018 | Champagne et al. | |
| 10,177,354 B2 | 1/2019 | Zanoni et al. | |
| 10,608,300 B2 | 3/2020 | Reinhold | |
| 2009/0071178 A1 | 3/2009 | Major et al. | |
| 2019/0393572 A1 | 12/2019 | Kuzuhara | |
| 2020/0152941 A1 | 5/2020 | Wynn et al. | |
| 2020/0194750 A1 | 6/2020 | Kawano | |
| 2021/0143492 A1* | 5/2021 | Zagrodnik | B60L 58/27 |
| 2022/0111971 A1* | 4/2022 | Demont | H01M 50/502 |

FOREIGN PATENT DOCUMENTS

| | | |
|---|---|---|
| CN | 203277513 U | 11/2013 |
| CN | 109037853 A | 12/2018 |
| CN | 211719370 U | 10/2020 |
| JP | 4606139 B2 | 1/2011 |
| WO | 2020078972 | 4/2020 |

* cited by examiner

*Primary Examiner* — Gary D Harris
(74) *Attorney, Agent, or Firm* — Caldwell Intellectual Property Law, LLC

(57) ABSTRACT

In an aspect a system for battery environment management in an electric aircraft, where in the system include, at least a at least a battery pack mounted within a fuselage of an electric aircraft. A battery pack may include a plurality of batteries configured to provide electrical power to the electric aircraft. A battery pack may also include a pouch cell. Adjacent to the battery pack there may be at least a channel. A channel is configured to provide a flow path for directing battery ejecta to a predetermined location.

20 Claims, 8 Drawing Sheets

SYSTEM FOR BATTERY ENVIRONMENT MANAGEMENT IN AN ELECTRIC AIRCRAFT AND A METHOD FOR ITS USE

FIELD OF THE INVENTION

The present invention generally relates to the field of electric aircrafts. In particular, the present invention is directed to a system for battery environment management in an electric aircraft and a method for its use.

BACKGROUND

The burgeoning of electric vertical take-off and landing (eVTOL) aircraft technologies promises an unprecedented forward leap in energy efficiency, cost savings, and the potential of future autonomous and unmanned aircraft. However, the technology of eVTOL aircraft is still lacking in crucial areas of energy source solutions.

SUMMARY OF THE DISCLOSURE

In an aspect a system for battery environment management in an electric aircraft, where in the system include, at least a at least a battery pack mounted within a fuselage of an electric aircraft. A battery pack may include a plurality of batteries configured to provide electrical power to the electric aircraft. A battery pack may also include a pouch cell. Adjacent to the battery pack there may be at least a channel. A channel is configured to provide a flow path for directing battery ejecta to a predetermined location.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for a system for battery environment management in an electric aircraft. In an embodiment, the system is comprised for at least a battery pack and a channel that is adjacent to that battery pack. The battery back maybe located within the fuselage of the electric aircraft. In embodiments, a battery pack may be comprised of pouch cells. The channels may be located adjacent to the battery packs. The channels will be configured to transport battery ejecta to a predetermined location that is away from the battery. Aspects of the present disclosure can be used to remove heat or undesirable gases from the battery. Exemplary embodiments illustrating aspects of the present disclosure are described below in the context of several specific examples.

Figure 1:
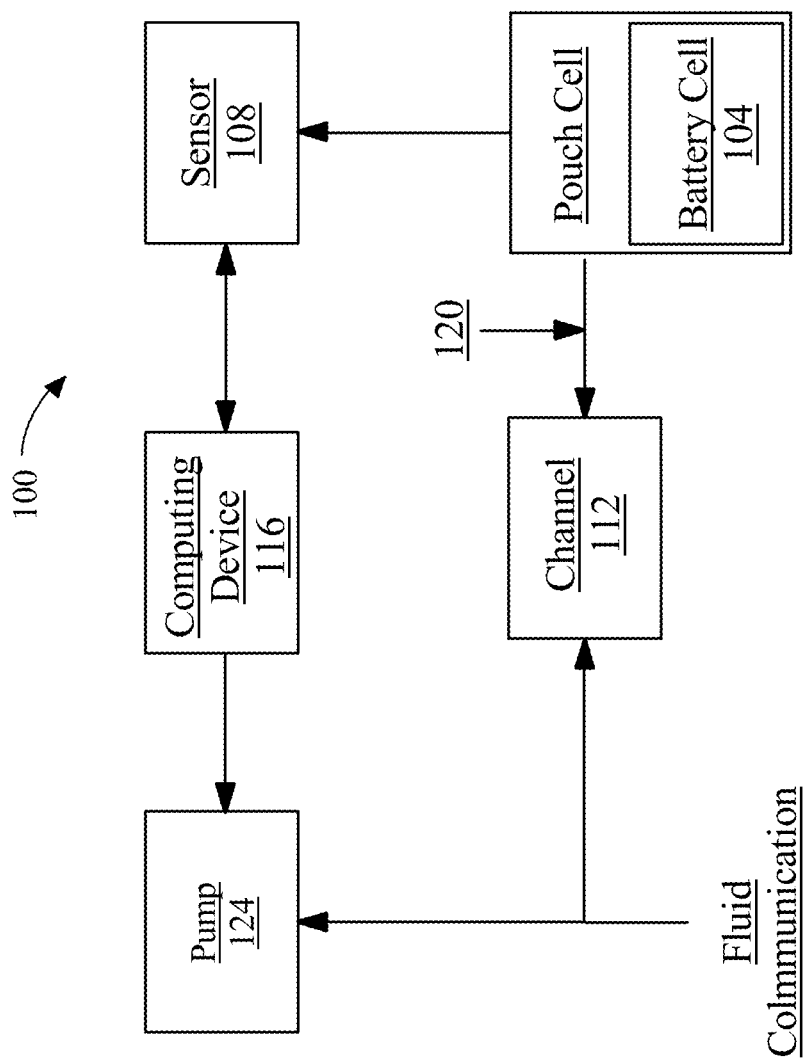
FIG. 1 is a block diagram of an exemplary system for to a system for battery environment management in an electric aircraft.

Referring now to the drawings, FIG. 1 illustrates an embodiment of battery environment management in an electric aircraft system 100. System 100 may include a plurality of battery modules 104. A "battery module" contains plurality of battery cells that have been wired together in series, parallel, or a combination of series and parallel, wherein the "battery module" holds the battery cells in a fixed position. Battery module 104 may be consistent with any battery module disclosed in U.S. application Ser. No. 17/404,500, filed on Aug. 17, 2021, and entitled "STACK BATTERY PACK FOR ELECTRIC VERTICAL TAKE-OFF AND LANDING AIRCRAFT," or U.S. application Ser. No. 17/475,743, filed on Sep. 15, 2021, and entitled "BATTERY SYSTEM AND METHOD OF AN ELECTRIC AIRCRAFT WITH SPRING CONDUCTORS," the entirety of both applications is hereby incorporated by reference.

With continued reference to FIG. 1, battery module includes an electrochemical cell. For the purposes of this disclosure, an "electrochemical cell" is a device capable of generating electrical energy from chemical reactions or using electrical energy to cause chemical reactions. Further, voltaic or galvanic cells are electrochemical cells that generate electric current from chemical reactions, while electrolytic cells generate chemical reactions via electrolysis. In some embodiments, battery module 104 may include cylindrical battery cells. For the purposes of this disclosure, cylindrical battery cells are round battery cells that have a larger height than diameter.

With continued reference to FIG. 1, battery module 104 may include pouch cell. As used in this disclosure, "pouch cell" is any battery cell or module that includes a pocket. In some cases, a pouch cell may include or be referred to as a prismatic pouch cell, for example when an overall shape of pouch is prismatic. In some cases, a pouch cell may include a pouch which is substantially flexible. Alternatively or additionally, in some cases, a pouch may be substantially rigid. In some cases, a pouch may include a polymer, such as without limitation polyethylene, acrylic, polyester, and the like. In some embodiments, a pouch may be coated with one or more coatings. For example, in some cases, a pouch may have an outer surface. In some embodiments, an outer surface may be coated with a metalizing coating, such as an aluminum or nickel containing coating. In some embodiments, a pouch coating may be configured to electrically ground and/or isolate pouch, increase pouch impermeability, increase pouches resistance to high temperatures, increases pouches thermal resistance (insulation), and the like. An electrolyte may be located in a pouch. In some embodiments, an electrolyte may include a liquid, a solid, a gel, a paste, and/or a polymer. In some embodiments, an electrolyte may include a lithium salt such as LiPF6. In some embodiments, a lithium salt may include lithium hexafluorophosphate, lithium tetrafluoroborate, lithium perchlorate, or other lithium salts. In some embodiments, a lithium salt may include an organic solvent. In some embodiments, an organic solvent may include ethylene carbonate, dimethyl carbonate, diethyl carbonate or other organic solvents. In some embodiments, an electrolyte may wet or contact one or both of a pair of conductive tabs of a battery cell. A "conductive tab" as used in this disclosure is any protruding component capable of carrying a current.

With continued reference to FIG. 1, battery cells may include without limitation a battery cell using nickel-based chemistries such as nickel cadmium or nickel metal hydride, a battery cell using lithium-ion battery chemistries such as a nickel cobalt aluminum (NCA), nickel manganese cobalt (NMC), lithium iron phosphate (LiFePO4), lithium cobalt oxide (LCO), lithium manganese oxide (LMO), a battery cell using lithium polymer technology, and/or metal-air batteries. Battery cells may include lead-based batteries such as without limitation lead acid batteries and lead carbon batteries. Battery cells may include lithium sulfur batteries, magnesium ion batteries, and/or sodium ion batteries. Battery cells may include solid state batteries or supercapacitors or another suitable energy source. Persons skilled in the art, upon reviewing the entirety of this disclosure, will be aware of various devices of components that may be used as a battery cell. Battery module may be primary or secondary or a combination of both. Additional disclosure related to batteries and battery modules may be found in co-owned U.S. Patent Applications entitled "SYSTEM AND METHOD FOR HIGH ENERGY DENSITY BATTERY MODULE" and "SYSTEMS AND METHODS FOR RESTRICTING POWER TO A LOAD TO PREVENT ENGAGING CIRCUIT PROTECTION DEVICE FOR AN AIRCRAFT," having U.S. patent application Ser. Nos. 16/948,140 and 16/590,496 respectively; the entirety of both applications are incorporated herein by reference.

With continued reference to FIG. 1, battery module 104 may include a battery module 104 may include a sensor. A sensor may be coupled to battery cells. In some embodiments, a sensor may be mechanically and/or electrically coupled to battery cells. A sensor may include a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery cells measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a system and/or a user to detect phenomenon is maintained and in a non-limiting example, a user alter aircraft usage pursuant to sensor readings.

With continued reference to FIG. 1, battery module 104 may be mounted in the fuselage of an electric aircraft. As used in the current disclosure, a "fuselage" is the main body of an aircraft, or in other words, the entirety of the aircraft except for the cockpit, nose, wings, empennage, nacelles, any and all control surfaces, and generally contains an aircraft's payload. In embodiments, the battery module will me mechanically connected to the fuselage of the electric aircraft. The fuselage of an electric aircraft is disclosed in greater detail FIG. 6.

With continued reference to FIG. 1, at least a sensor 108 may be configured to detect battery ejecta 124. As used in this disclosure, a "sensor" is a device that is configured to detect an input and/or a phenomenon and transmit information related to the detection. For example, and without limitation, a sensor may transduce a detected charging phenomenon and/or characteristic, such as, and without limitation, temperature, voltage, current, pressure, and the like, into a sensed signal. In one or more embodiments, and without limitation, sensor 108 may include a plurality of sensors. In one or more embodiments, and without limitation, sensor 108 may include one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, and the like. Sensor 108 may be a contact or a non-contact sensor. In one or more embodiments, sensor 108 may transmit/receive signals to/from a computing device. Signals may include electrical, electromagnetic, visual, audio, radio waves, or another undisclosed signal type alone or in combination.

With continued reference to FIG. 1, a sensor 108 may include a humidity sensor. Humidity, as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity," for the purposes of this disclosure, is expressed as a percentage, indicating a present stat of absolute humidity relative to a maximum humidity given the same temperature. "Specific humidity," for the purposes of this disclosure, is the ratio of water vapor mass to total moist air parcel mass, where parcel is a given portion of a gaseous medium. A humidity sensor may include a psychrometer. A humidity sensor may include a hygrometer. A humidity sensor may be configured to act as or include a humidistat. A "humidistat," for the purposes of this disclosure, is a humidity-triggered switch, often used to control another electronic device. A humidity sensor may use capacitance to measure relative humidity and include in itself, or as an external component, include a device to convert relative humidity measurements to absolute humidity measurements. "Capacitance," for the purposes of this disclosure, is the ability of a system to store an electric charge, in this case the system is a parcel of air which may be near, adjacent to, or above a battery cell. A sensor 108 may include a multimeter. A multimeter may be configured to measure voltage across a component, electrical current through a component, and resistance of a component. A multimeter may include separate sensors to measure each of the previously disclosed electrical characteristics such as voltmeter, ammeter, and ohmmeter, respectively.

With continued reference to FIG. 1, a sensor 108 may include a sensor or plurality thereof that may detect voltage and direct the charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like. For instance, and without limitation, a sensor may be configured to determine that a charge level of a battery cell is high based on a detected voltage level of that battery cell or portion of the battery pack. A sensor 108 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. A sensor 108 may include digital sensors, analog sensors, or a combination thereof. A sensor may include digital-to-analog converters (DAC), analog-to-digital converters (ADC, A/D, A-to-D), a combination thereof.

With continued reference to FIG. 1, a sensor 108 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within a sensor 108, may be measured in Fahrenheit (° F.), Celsius (° C.), Kelvin (° K), or another scale alone or in combination. A temperature measured by sensors may comprise electrical signals which are transmitted to their appropriate destination wireless or through a wired connection.

With continued reference to FIG. 1, a sensor 108 may include a sensor configured to detect gas that may be emitted during or after a catastrophic cell failure. "Catastrophic cell failure," for the purposes of this disclosure, refers to a malfunction of a battery cell, which may be an electrochemical cell, which renders the cell inoperable for its designed function, namely providing electrical energy to at least a portion of an electric aircraft. Byproducts of catastrophic cell failure may include gaseous discharge including oxygen, hydrogen, carbon dioxide, methane, carbon monoxide, a combination thereof, or another undisclosed gas, alone or in combination. Further, a sensor may be configured to detect vent gas from electrochemical cells that may comprise a gas detector. For the purposes of this disclosure, a "gas detector" is a device used to detect a gas is present in an area. Gas detectors, and more specifically, the gas sensor that may be used in a sensor, may be configured to detect combustible, flammable, toxic, oxygen depleted, a combination thereof, or another type of gas alone or in combination. A gas sensor that may be present in a sensor may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. A sensor may include sensors that are configured to detect non-gaseous byproducts of catastrophic cell failure including, in non-limiting examples, liquid chemical leaks including aqueous alkaline solution, ionomer, molten phosphoric acid, liquid electrolytes with redox shuttle and ionomer, and salt water, among others. A sensor may include sensors that are configured to detect non-gaseous byproducts of catastrophic cell failure including, in non-limiting examples, electrical anomalies as detected by any of the previous disclosed sensors or components.

With continued reference to FIG. 1, battery module 104 may include a bus element. For the purposes of this disclosure, a "bus element" is an electrically conductive pathway connecting at least a component in a system configured to convey electrical energy between components. Bus element may include one or more electrically conductive pathways configured to transfer electrical energy across the pathways to convey electrical energy from one component to one or more other components. Bus element may include a ring bus. Bus element may be implemented as disclosed in U.S. application Ser. No. 17/348,240, filed on Jun. 15, 2021, titled "System and Method for Dynamic Excitation of an Energy Storage Element Configured for Use in an Electric Aircraft," the entirety of which is hereby incorporated by reference. For the purpose of this disclosure, a "ring bus" is a bus element wherein circuit breakers are connected to form a ring with isolators on both sides of each circuit breaker. Ring bus may include a component configured to isolate a fault by tripping two circuit breakers while all other circuits remain in service; such a component may include a cross tie element as described in this disclosure.

With continued reference to FIG. 1, battery module 104 may be mechanically connected a plurality of a channels 112. As used in this disclosure a "Channel" is an opening and/or aperture configured to allow one or more gases, liquids, and/or solids to pass out of a confined space, such as the area surrounding of a battery module. In an embodiment, channel 112 may be configured to move battery ejecta 120 from battery module 104. Channel 112 may be located adjacent to the battery pack. Embodiments of channel 112 may be comprised of carbon fiber. In other embodiments, channel 112 include a surface coating consisting of carbon fiber.

With continued reference to FIG. 1, channel 112 may be completely enclosed to from a duct. As used in the current disclosure, a "duct" is an enclosure, usually of sheet metal or plastic, that conducts heated or conditioned air. In some embodiments, channel 112 may be completely enclosed as to create an airtight seal or watertight seal between the battery and channel 112.

In an embodiment, a surface coating of channel 112 and/or duct may include any surface coating, including a coating including ablative material, as described in U.S. Nonprovisional application Ser. No. 17/563,331, filed on Dec. 28, 2021 and entitled "A SYSTEM FOR ELECTRIC AIRCRAFT BATTERY VENTING USING A VENT CONDUIT," the entirety of which is incorporated by reference herein.

With continued reference to FIG. 1, channel 112 maybe in fluid communication with a manifold. As used in the current disclosure, a "manifold" is a larger channel, which funnel into multiple smaller channels. A manifold may also include multiple smaller channels funneling into a larger channel. In embodiments, a manifold may be used to consolidate multiple smaller channels 112 coming from each battery 104 into one large channel. In other embodiments, a manifold may be configured for liquids or gases. The larger end of a manifold may be configured to output the gas or liquid into a predetermined location.

With continued reference to FIG. 1, channel 112 may be configured to provide a flow path battery ejecta 120 from the battery cell to predetermined location. As used in the current disclosure, "Battery ejecta" refers to any undesirable matter or gas that emanates from battery module 104. In embodiments, Battery ejecta 120 may include but is not limited to undesirable fumes, hydrogen gas, heated air, or other gases, lithium particles, and the like. In embodiments, gases may include gases that have a toxic component. Battery ejecta 120 may also include any exhaust that the batteries excrete. The Battery ejecta 120 may include lithium ion particles.

With continued reference to FIG. 1, channel 112 may be configured to provide thermal control for battery pack 104. As used in the current disclosure, "thermal control" the use of various temperature monitoring devices and cooling methods, such as forced air flow to control overall temperature of the battery pack. In an embodiment, and without limitation, channel 112 may be configured to channel heat from battery module 104. For example, Channel 112 may contain fans, heaters, or other temperature regulating devices to provide thermal control for Battery Pack 104. In embodiments, a computing device may regulate thermal control may occur as a function of the output of sensor 108.

With continued reference to FIG. 1, system 100 may include a pump 124 that is in fluid communication with channel 112. As used in the current disclosure, a "Pump" is a mechanical device using suction or pressure to raise or move liquids or gases through Channel 112. In embodiment, pump 124 may be used to move battery ejecta 120. For example, a pump may be used to pressurize and move undesirable gases that are excreted from the batteries though channel 112. In other embodiments, a pump may be used to pressurize and move fluids that accumulate within the batteries though channel 112. Pumps 124 may be configured to be communicatively connected to a computing device. A computing device 116 may control a pump as a function of the output from at least a sensor to signify the pumps to turn on. A computing device 116 may additionally regulate the how long each pump 124 is working. In other embodiments, a computing device may regulate the pressurization of the pump.

With continued reference to FIG. 1, system 100 may include a valve that is in fluid communication with channel 112. A valve may be in fluid communication with at least a pump. As used in this disclosure, a "check valve" a device for controlling the passage of fluid or gases through a pipe, duct, channel, etc. In some embodiments, a valve permits flow of a fluid or gas only one direction. In some cases valve may be configured to allow flow of gas or fluids substantially only away from battery module 104 while preventing back flow of vented fluid or gas to battery module 104. In embodiments, valve may include a duckbill check valve. In some cases, a duckbill check valve may have lips which are substantially in a shape of a duckbill. Lips may be configured to open to allow forward flow (out of the lips), while remaining normally closed to prevent backflow (into the lips). In some cases, duckbill lips may be configured to automatically close (remain normally closed), for example with use of a compliant element, such as without limitation an elastomeric material, a spring, and the like. In some embodiments vent port 108 may include a mushroom poppet valve. In some cases, a mushroom poppet valve may include a mushroom shaped poppet. Mushroom shaped poppet may seal against a sealing element, for example a ring about an underside of a cap of the mushroom shaped poppet. In some cases, mushroom poppet valve may be loaded against sealing element, for example by way of a compliant element, such as a spring.

With continued reference to FIG. 1 in some cases, channel 112 may be configured to vent ejecta from one or more of a lithium ion battery and a lithium metal battery. For example, in some cases, a lithium metal battery may produce ejecta with a substantially more ablative characteristics (e.g., higher temperature). In some cases, a channel 112 configured to vent ejecta from a lithium-ion battery may not vent ejecta from a lithium metal battery. For example, in some cases, a channel consisting of titanium may be used to vent lithium ion ejecta, while ejecta from a lithium metal battery may not be vented with titanium, in some cases. In some cases, a channel 112 consisting of carbon fiber may be used to vent ejecta from a lithium metal battery.

Still referring to FIG. 1, in some cases system 100 may be configured to provide venting per DO-311-A. In some cases, system 100 may be configured to vent ejecta 120 substantially away from a cabin of aircraft. In some cases, system 100 may operate so that substantially no ejecta or electrolyte may enter cabin of aircraft, even during a thermal runaway or aircraft crash. In some cases, system 100 may include one or more of a sealed vent, a closed vent, or an unsealed vent.

Still referring to FIG. 1, an exemplary embodiment of a system 100 for a system for battery environment management in an electric aircraft is illustrated. System includes a computing device 116. computing device 116 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device 116 may include a single computing device operating independently, or may include two or more computing device operating in concert, in parallel, sequentially or the like; two or more computing devices may be included together in a single computing device or in two or more computing devices. computing device 116 may interface or communicate with one or more additional devices as described below in further detail via a network interface device. Network interface device may be utilized for connecting computing device 116 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 116 may include but is not limited to, for example, a computing device or cluster of computing devices in a first location and a second computing device or cluster of computing devices in a second location. computing device 116 may include one or more computing devices dedicated to data storage, security, distribution of traffic for load balancing, and the like. computing device 116 may distribute one or more computing tasks as described below across a plurality of computing devices of computing device, which may operate in parallel, in series, redundantly, or in any other manner used for distribution of tasks or memory between computing devices. computing device 116 may be implemented using a "shared nothing" architecture in which data is cached at the worker, in an embodiment, this may enable scalability of system 100 and/or computing device.

With continued reference to FIG. 1, computing device 116 may be designed and/or configured to perform any method, method step, or sequence of method steps in any embodiment described in this disclosure, in any order and with any degree of repetition. For instance, computing device 116 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 116 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 2:
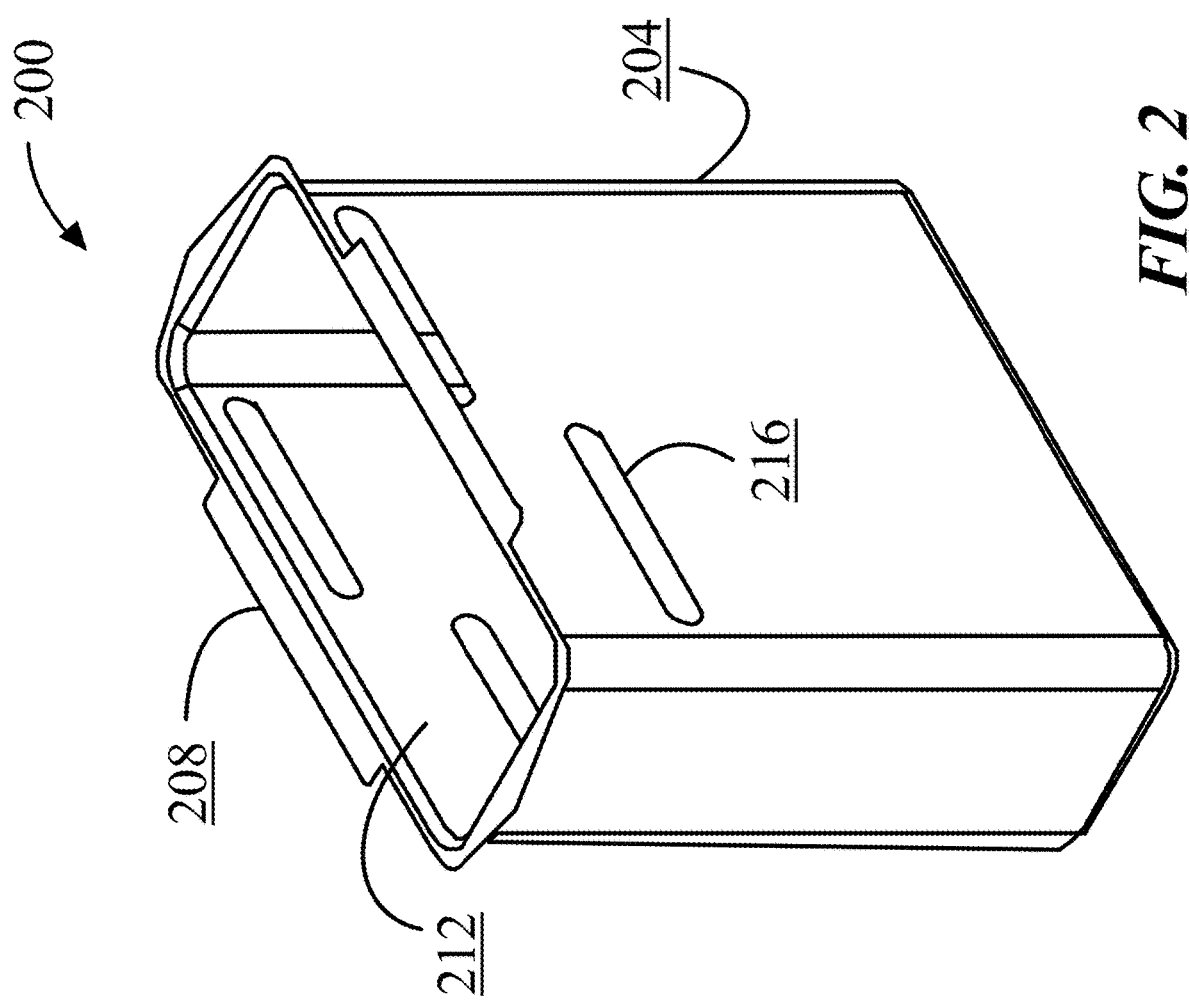
FIG. 2 is a diagrammatic representation of an exemplary embodiment of the case.

Now, referring to FIG. 2, system 200 illustrates a diagrammatic representation of an exemplary embodiment of the case. The system includes exterior surface 204 of the case, interior surface 208, opening 212, lip 216, and hole 220. In this embodiment, the term "case" refers to a container designed to hold or protect something; in this case, the case is holding and protecting the plurality of battery cells, which is described further herein with reference to FIG. 3. In some cases, case 200 may be made from metal for example one or more of sheet metal, stamped metal, extruded metal, and/or machined metal. In some cases, case 200 may be formed by way of welding, brazing, and/or soldering. In some cases, case 200 may be composed wholly or in part of a relatively light and strong metal, such as without limitation aluminum alloy. As shown in FIG. 1, case 200, may include an exterior surface 204 and interior surface 208 that are curated from different materials, and are explained further below. In some versions, case may provide a firewall between flammable battery modules within the battery and an environment or vehicle surrounding the battery.

Still referring to FIG. 2, case 200 includes an exterior surface 204. In this disclosure, "exterior surface" is the surface on the outside of the case that protects the layers of battery cells on the inside. Exterior surface 204 may be made from any of the materials above. A possible material the exterior surface may be composed of, without limitation, is nickel-coated steel; this material works well with lithium-ion batteries due to the corrosion protection and chemical resistance provided by the nickel. Additionally, exterior surface 204 may not be thermally conductive so it may contain the electric charge within the casing and avoid any sort of injury to a worker.

Still referring to FIG. 2, case 200 includes an interior surface 208. In this disclosure, the "interior surface" is the surface on the inside of the case that comes into contact with the layer of the plurality of battery cells. Interior surface 208 may include of any adonized material. In this disclosure, anodized means that the object is coated in a protective oxide layer through an electrochemical process. The purpose of anodizing a material is to increase its thermal conductivity, corrosion resistance, and abrasion resistance. Adonizing the interior surface 208 of the case allows for the mitigation of charge buildup and avoids storing energy at a high voltage. Examples of adonized materials that interior surface 208 may be composed of are aluminum, aluminum alloys, magnesium, titanium, and the like. It is important to note that the interior surface 208 and exterior surface 204 of the case are made from different materials and are explained further herein with reference to FIG. 3.

Still referring to FIG. 2, case 200 includes opening 212. Opening 212 may be located anywhere on the case, but the exemplary embodiment illustrates the opening at the top of the case. In this disclosure, an "opening" is a hole on the case that allows the layer of battery cells to be place inside and also allows a lid to be secured to it. The main purpose of the opening may be to have an entrance and exit for the installation and removal of the layers of battery cells. Lid is further described herein with reference to FIG. 5. Examples of opening 212 may be the entire top surface of the case missing to become a hole, as seen in FIG. 1, or a side surface could be removed and become opening 212 on the case. Only one opening 212 may be needed, but more may be placed on the case 200 if necessary. Opening 212 has a different function than hole 220, which is explained further below. Opening 212 is discussed more herein with reference the lid in FIG. 5.

Still referring to FIG. 2, case 200 includes lip 216. In this disclosure, "lip" is an edge that projects out of opening 212 of case 200 wherein the lid of the case may rest on it without falling into the case. Lip 216 may include a longer side and a shorter side. Lip 216 may also include a flange on its longer side to attach the lid to the case. In this embodiment, a "flange" is a piece of the lip that serves to stabilize the lid to the case. There may be at least one lip 216 attached to the opening but there may be any amount; more lips mean more flanges to lock lid into place.

Still referring to FIG. 2, case 200 may include hole 220. More than one hole 220 may be cut into case 200 if needed. In this embodiment, hole 220 serves as a cutout located on the outside of the case. Hole 220 may not be as large as opening 212 and may not be covered with a lid. The purpose of hole 220, or holes, may be to vent hot gases out of the case to reduce the temperature and voltage inside the case. In some embodiments, the cutouts may be covered by a material to stop the ventilation and to stop any foreign materials from entering the case, but the materials must be heat resistant, so the hot gases do not melt it. Hole or holes 220 are not needed to for the system 200 but are useful to help cool and ventilate the case.

Figure 3:
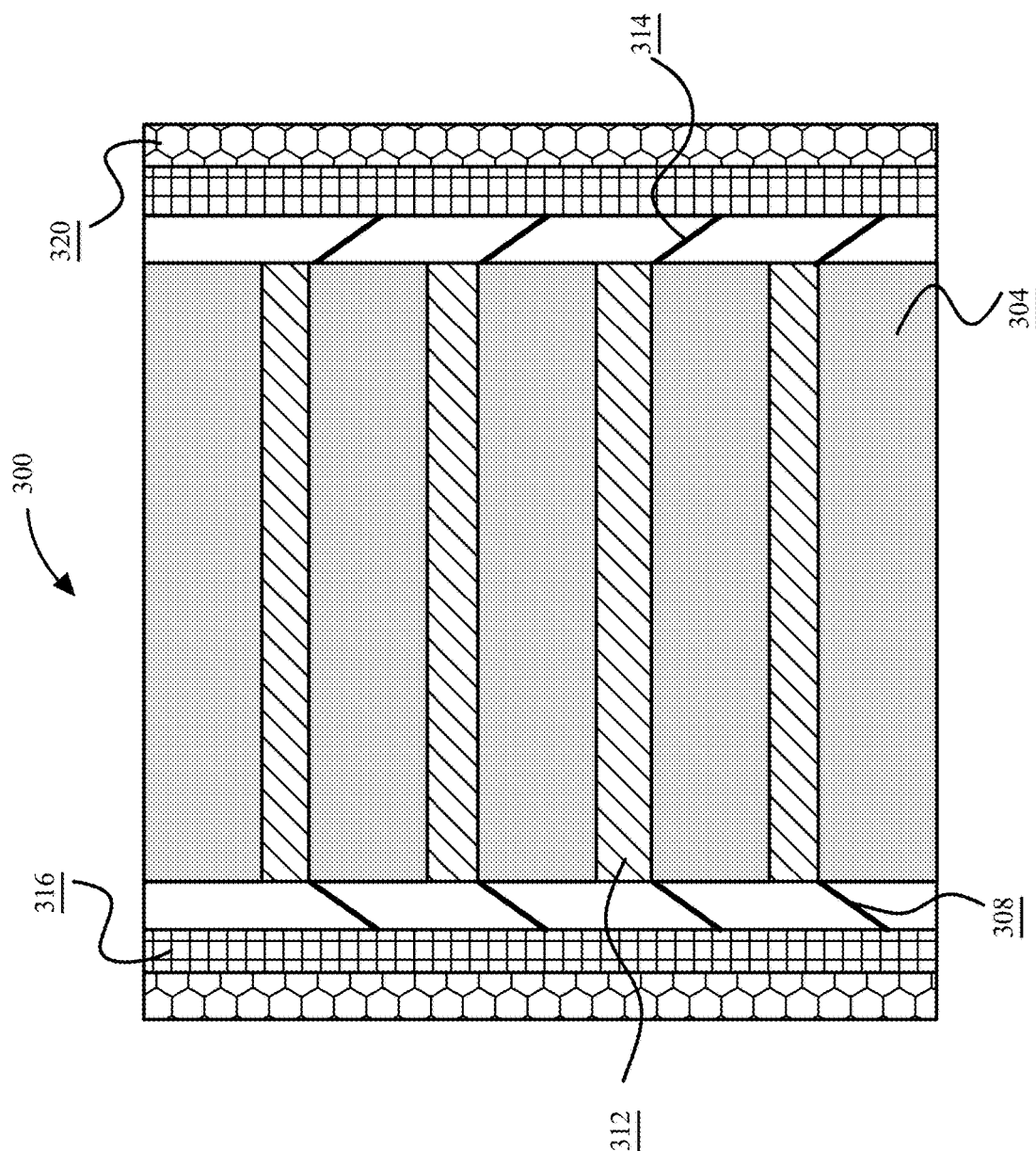
FIG. 3 is a diagram showing a possible embodiment of the plurality of battery cells.

Now referring to FIG. 3, an exemplary embodiment of the layers of the plurality of battery cells is illustrated. The system 300 comprises of a plurality of layering of the following: battery cell 304, fin 308, insulation layer 312, interior surface 208, and exterior surface 204. In this disclosure, "layers" refers to the method of stacking the plurality of battery cells on top of each other when placing them into the case.

Still referring to FIG. 3, system 300 includes a plurality of battery cells 304. A first plurality of battery cells may include lithium-ion battery cells. A first plurality of battery cells may include pouch cells. In some embodiments, a battery cell of a first plurality of battery cells may include a flexible casing. A "battery cell" as used in this disclosure, is an electrochemical element that holds an electric potential. In some embodiments, plurality of battery cells 304 may be lithium-ion pouch cells. In some embodiments, battery pack may be configured to hold 16 battery cells. In some embodiments, battery pack may be configured to include any number of battery cells. In other embodiments, battery pack may be configured to hold more or less than 16 battery cells. Battery cells 304 in the battery pack may be electrically configured to connect to one another. In one embodiment, battery cells 304 may have an insulating barrier. In some embodiments, battery cells 304 may be configured in series and/or in parallel. In some embodiments, battery cells 304 may be positioned in one row in the battery pack. In other embodiments, battery cells 304 may be positioned in multiple rows in the battery pack. In some embodiments, battery cells 304 may be in a staggered arrangement in battery pack. In some embodiments, a battery assembly may be configured to include an electrical bridging device. An electrical bridging device may include a cooling element. As used in the current disclosure, a "cooling element" is a device used to lower a temperature of a component such as a battery. In a nonlimiting example, a cooling element may include air conditioners, fans, air cooled heat exchanger, the use of coolant, water cooler, or the like. In some embodiments, an electrical bridging device may be configured to carry an electrical current. In some embodiments, an electrical bridging device may be configured to be housed inside a plurality of battery cells. In some embodiments, a top of each battery cell of a plurality of battery cells may be coupled to a first side of an electrical bridging device. In some embodiments, a top of each battery cell of a plurality of battery cells may be coupled to another side of an electrical bridging device.

In some embodiments and still referring to FIG. 3, battery cells 304 may be disposed and/or arranged within a respective battery pack in groupings of any number of columns and rows. In some embodiments, any two adjacent rows of battery cells 304 may be offset by a distance equal to a width or length of a battery cell 304. This arrangement of battery cells 304 is only a non-limiting example and in no way precludes other arrangement of battery cells. In some embodiments, battery cells 304 may be fixed in position by a battery cell retainer. Battery cells 304 may each include a cell configured to include an electrochemical reaction that produces electrical energy sufficient to power at least a portion of an electric aircraft. In some embodiments, battery cells 304 may be electrically connected in series, in parallel, or a combination of series and parallel. Series connection, as used herein, includes wiring a first terminal of a first cell to a second terminal of a second cell and further configured to include a single conductive path for electricity to flow while maintaining the same current (measured in Amperes) through any component in the circuit. Battery cells 304 may use the term 'wired', but one of ordinary skill in the art would appreciate that this term is synonymous with 'electrically connected', and that there are many ways to couple electrical elements like battery cells 304 together. As an example, battery cells 304 may be coupled via prefabricated terminals of a first gender that mate with a second terminal with a second gender. Parallel connection, as used herein, includes wiring a first and second terminal of a first battery cell to a first and second terminal of a second battery cell and further configured to include more than one conductive path for electricity to flow while maintaining the same voltage (measured in Volts) across any component in the circuit. Battery cells 304 may be wired in a series-parallel circuit which combines characteristics of the constituent circuit types to this combination circuit. Battery cells 304 may be electrically connected in any arrangement which may confer onto the system the electrical advantages associated with that arrangement such as high-voltage applications, high-current applications, or the like. In some embodiments, battery cell retainer may employ a staggered arrangement to allow more battery cells to be disposed closer together than in columns and rows like in a grid pattern. A staggered arrangement may also be configured to allow better thermodynamic dissipation. In other embodiments, cell retainer may hold battery cells 304 in a square or grid-like pattern.

Still referring to FIG. 3, system 300 includes a layer of insulation 312 between each later of battery cells 304. In this disclosure, "insulation layer" is the layer of thermal insulation separating the layers of plurality of battery cells. Insulation layer 312 will be compressed, so the material from which it is made up of must withstand the expected pressure from the compressed case; the case applies a pressure within a range of 2-5 pounds per square inch (PSI) (1.4-3.4 kPa) to the layers of insulation and layers of plurality of battery cells. For example, using the spring constant of the material as a metric of interest, the spring constant of the material should be non-negligible. In this disclosure, the spring constant is the force needed to stretch or press a spring. In some embodiments, the material may be aerogel since it is a good thermal insulator and has a non-negligible spring constant. Insulation layer 312 prevents heat from spreading from one cell to another. Without any insulation, if a battery cell fails and releases catastrophic amounts of heat, then the whole battery will fail and cause catastrophic damage to the aircraft.

Still referring to FIG. 3, system 300 includes a thermally conducting fin 308 contacting the thermally conducting interior surface 208. In this disclosure, a thermally conducting fin is a small piece of thermally conducting material that contacts the insulation layer and the interior surface of the can. As used in this disclosure, a "thermally conducting" material is a material that has a high thermal conductivity as the term is understood to mean for persons in the battery/battery management line of work. Most materials considered thermally conductive have a thermal conductivity within the range of 10 or more watts per kelvin-meter; a highly thermally conductive material may have a thermal conductivity of greater than 200 watts per kelvin-meter. Example materials include, without limitation, silver, copper, aluminum, iron, titanium, or even diamond which has an extremely high thermal conductivity. Thermally conducting fin 308 includes a spring force that pushes it towards the anodized interior surface of the can. Fin 308 include a plurality of independent sections wherein each section has an independent spring force that independently pushed that section of the fin towards the adonized interior surface. In this disclosure, spring force is the force exerted by a compressed or stretched spring upon an object that may be attached to it. Fin 308 maybe made out of any material that may contain a spring force, such as elastic, spring steel, or the like. Fin 308 must also be made out of a conductive material so that the thermally conductive layer with the fins can conduct heat away from the cell. Fin 308 may be any shape or size as long as it is still contacting both surfaces. Additionally, inserting the system into case 200 may elastically deform thermally conducting fin 308, causing it to exert an elastic recoil force, such as without limitation a recoil force as indicated by Hooke's law.

Referring still to FIG. 3, system 300 includes a pouch cell within the battery cells 304. As used in this disclosure, "pouch cell" is a battery cell or module that includes a pouch. In some cases, a pouch cell may include or be referred to as a prismatic pouch cell, for example when an overall shape of pouch may be prismatic. In some cases, a pouch cell may include a pouch, which is further described herein with reference to FIG. 4. Pouch cell 404 may include without limitation a battery cell using nickel-based chemistries such as nickel cadmium or nickel metal hydride, a battery cell using lithium-ion battery chemistries such as a nickel cobalt aluminum (NCA), nickel manganese cobalt (NMC), lithium iron phosphate (LiFePO4), lithium cobalt oxide (LCO), lithium manganese oxide (LMO), a battery cell using lithium polymer technology, and/or metal-air batteries. Pouch cell 404 may include lead-based batteries such as without limitation lead acid batteries and lead carbon batteries. Pouch cell 404 may include lithium sulfur batteries, magnesium ion batteries, and/or sodium ion batteries. Pouch cell 404 may include solid state batteries or supercapacitors or another suitable energy source. In other embodiments, the pouch cell may be a prismatic, cylindrical, or other type of battery cell. In some embodiments, the pouch cell may be a lithium-ion battery. In some embodiments, the lithium-ion battery may include lithium-ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO). Persons skilled in the art, upon reviewing the entirety of this disclosure, will be aware of various devices of components that may be used as a pouch cell.

Figure 4:
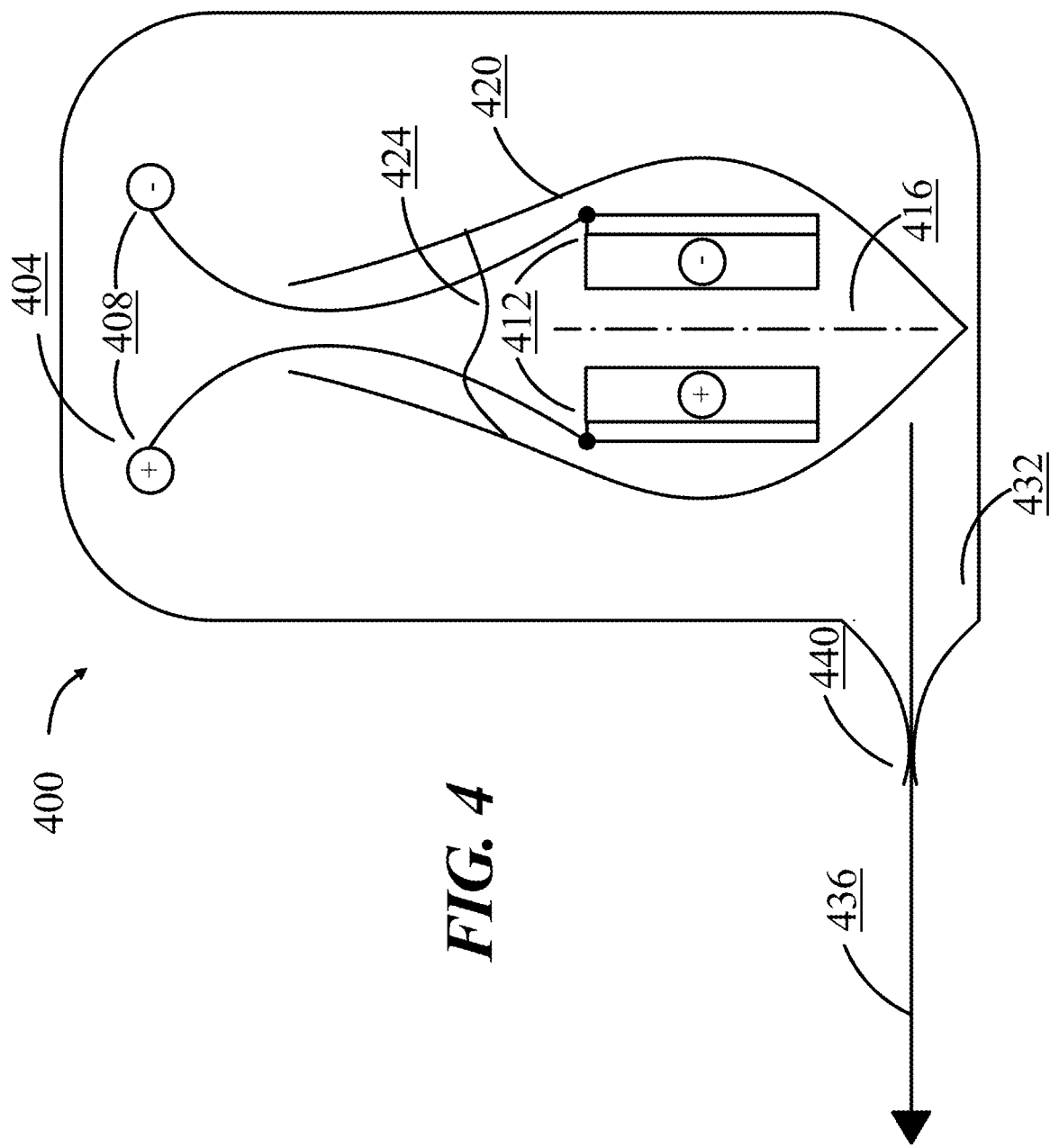
FIG. 4 is a diagrammatic representation of an exemplary embodiment of the pouch cell.

Referring now to FIG. 4, a pouch cell 404 is illustrated. Pouch cell includes a pair of electrodes 408, pair of foil tabs 412, insulation layer 416, pouch 420, electrolyte 424, ejecta barrier 428, vent 432, flow path 436, and valve 440. Pouch cell 404 may include any pouch cell as described in this disclosure.

Still referring to FIG. 4, pouch cell 404 may include a pair of electrodes 408. In this disclosure, a pair of electrodes is a conductor through which electricity enters or leaves an object, and in this case the object is pouch cell 404. In some embodiments, conductive foil tabs may be electrically connected to electrodes located inside a pouch cell 404. Electrodes 408 may include a positive electrode and a negative electrode. Each electrode of may include an electrically conductive element. Non-limiting exemplary electrically conductive elements include braided wire, solid wire, metallic foil, circuitry, such as printed circuit boards, and the like. Electrodes 408 may be in electric communication with a pair of foil tabs. Electrodes 408 may be bonded in electric communication with pair of foil tabs by any known method, including without limitation welding, brazing, soldering, adhering, engineering fits, electrical connectors, and the like.

Still referring to FIG. 4, pouch cell 404 may include a pair of foil tabs 412 in electrical communication with the electrodes 408. In this disclosure, pair of foil tabs 412 are tabs that protrude from the battery which allows the cells energy to be transferred to an external source. Conductive foils tabs 412 may be configured to carry positive and negative terminals to an outside of a battery cell of a first plurality of battery cells. In some embodiments, conductive foil tabs may be wielded to an outside of a battery cell. In some cases, pair of foil tabs 412 may include a cathode and an anode. In some cases, an exemplary cathode may include a lithium-based substance, such as lithium-metal oxide, bonded to an aluminum foil tab. In some cases, an exemplary anode may include a carbon-based substance, such as graphite, bonded to a copper tab. In some embodiments, an anode may be double sided. In some embodiments, a cathode may be double sided. In some embodiments, an anode and a cathode may be stacked and wrapped in a separator. In some embodiments, an anode, cathode, and separator may be stacked and wrapped in a z-fold pattern. In other embodiments, an anode, cathode, and separator may be stacked and wrapped in a rectangular, square, or other pattern. In some embodiments, a cathode and an anode may be welded together, placing them in a series connection. In one embodiment, a cathode and an anode may be welded ultrasonically. In some embodiments, a cathode and an anode may be further welded to pair of foil tabs 412. Pair of foil tabs 412 may be sealed to an outside portion of battery cell. An "outside portion" as used in this disclosure may be an exterior surface of an object. An outside portion may be included in a first plurality of battery cells and/or a second plurality of battery cells. In some embodiments, pair of foil tabs 412 may be configured to connect to an external load or power source. In some embodiments, pair of foil tabs 412 may be configured to power an electric aircraft. In some embodiments, an electric aircraft may be an electric vertical takeoff and landing vehicle ("eVTOL").

Still referring to FIG. 4, pouch cell 404 may include an insulator layer 416 located substantially between the at least a pair of foil tabs 412. As used in this disclosure, an "insulator layer" is an electrically insulating material that is substantially permeable to battery ions, such as without limitation lithium ions. In some cases, insulator layer may be referred to as a separator layer or simply separator. In some cases, insulator 416 may be configured to prevent electrical communication directly between pair of foil tabs 412 (e.g., cathode and anode). In some cases, insulator layer 416 may be configured to allow for a flow ions across it. Insulation layer 416 may include a polymer, for example polyolifine (PO). Insulation layer 416 may include pours which are configured to allow for passage of ions, for example lithium ions. In some cases, pours of a PO separator may have a width no greater than 100 μm, 10 μm, or 0.1 μm. In some cases, a PO separator may have a thickness within a range of 1-100 μm, or 10-50 μm.

Still referring to FIG. 4, pouch cell 404 may include a pouch 420 substantially encompassing the at least a pair of foil tabs 412 and at least a portion of the at least a separator layer 416. In this disclosure, pouch may be a small, flexible bag that holds the pair of foil tabs 412 and insulation layer 412. Pouch 420 may be substantially flexible. Alternatively or additionally, in some cases, a pouch 304 may be substantially rigid. In some cases, pouch 304 may include a polymer, such as without limitation polyethylene, acrylic, polyester, and the like. In some case, pouch 304 may be coated with one or more coatings. For example, in some cases, pouch 304 may have an outer surface. In some embodiments, the outer surface may be coated with a metalizing coating, such as an aluminum or nickel containing coating. In some cases, pouch coating be configured to electrically ground and/or isolate pouch, increase pouches impermeability, increase pouches resistance to high temperatures, increases pouches thermal resistance (po), and the like.

Still referring to FIG. 4, pouch cell 404 may include and an electrolyte 424 within the pouch 420. An electrolyte may be located in pouch 420. In this disclosure, electrolyte is a chemical medium that allows the flow of electrical charge between the cathode and anode of the pair of foil tabs 412. In some cases, the electrolyte may include a liquid, a solid, a gel, a paste, and/or a polymer. In some embodiments, the electrolyte may be a lithium salt such as LiPF6. In some embodiments, the lithium salt may be lithium hexafluorophosphate, lithium tetrafluoroborate, lithium perchlorate, or other lithium salts. In some embodiments, the lithium salt may be in an organic solvent. In some embodiments, the organic solvent may be ethylene carbonate, dimethyl carbonate, diethyl carbonate or other organic solvents. In some embodiments, the electrolyte may wet or contact one or both of at least a pair of foil tabs Still referring to FIG. 4, pouch cell 404 may include an ejecta barrier 428. As used in this disclosure, an "ejecta barrier" is any material or structure that is configured to substantially block, contain, or otherwise prevent passage of cell ejecta. For example, ejecta barrier 428 may substantially encapsulate pouch cell 404. As used in this disclosure, "ejecta" may be any material that has been ejected, for example from a battery cell. In some cases, cell ejecta may be ejected during thermal runaway of a battery cell. Alternatively or additionally, in some cases, cell ejecta may be ejected without thermal runaway of a battery cell. In some cases, cell ejecta may include lithium-based compounds. Alternatively or additionally, cell ejecta may include carbon-based compounds, such as without limitation carbonate esters. Cell ejecta may include matter in any phase or form, including solid, liquid, gas, vapor, and the like. In some cases, cell ejecta may undergo a phase change, for example, and without limitation, cell ejecta may be vaporous as it is initially being ejected and then cool and condense into a solid or liquid after ejection. In an embodiment, and without limitation, ejecta barrier 428 may be configured to prevent materials ejected from pouch cell 404 from coming into contact with other pouch cells. For example, and without limitation, ejecta barrier 428 may be substantially impermeable to cell ejecta from pouch cell 104 and/or one or more additional pouch cells. In some embodiments, ejecta barrier 428 may include titanium. As used in this disclosure "substantially impermeable" may be a characteristic of ejecta barrier that denotes the barrier prevents passage of one or more gases, fluids, and/or solids. In an embodiment, and without limitation, substantially impermeable may include a barrier being fully impermeable. For example, and without limitation, ejecta barrier 428 may be fully impermeable as a function of restricting and/or preventing all passage of cell ejecta across a barrier. As a further non-limiting example, ejecta barrier 428 may be impermeable as a function of blocking and/or halting all passage of cell ejecta across a barrier. In an embodiment, and without limitation, substantially impermeable may include ejecta barrier 428 being selectively impermeable, wherein a magnitude and/or percentage of cell ejecta may be allowed to pass and/or permeate ejecta barrier 428. For example, and without limitation, ejecta barrier 428 may be selectively impermeable for a fluid as a function of allowing 20% of a fluid to permeate, wherein ejecta barrier 428 may be impermeable to a gas such as carbon monoxide, wherein no carbon monoxide may permeate ejecta barrier 428.

Still referring to FIG. 4, ejecta barrier 428 may include a carbon fiber element. As used in this disclosure a "carbon fiber element" is a barrier comprising an element of carbon. For example and without limitation, carbon fiber element may include one or more carbon fiber sheets, carbon fiber supported metals, carbon fiber bands, and the like thereof. In an embodiment, and without limitation, carbon fiber element may include one or more carbon fibers comprising 5-10 micrometers in diameter. In another embodiment, and without limitation, carbon fiber element may include high stiffness, high tensile strength, low weight to strength ratio, high chemical resistance, high temperature tolerance, and/or low thermal expansion. In an embodiment, and without limitation, carbon fiber element may include one or more composites such as a plastic resin, polymer, graphite, and the like thereof. In some cases, ejecta barrier 428 may include at least a one of a lithophilic or a lithophobic material or layer, configured to absorb and/or repel lithium-based compounds. In some cases, ejecta barrier 428 may include a lithophilic metal coating, such as silver or gold. In some cases, ejecta barrier 428 may be flexible and/or rigid. In some cases, ejecta barrier 428 may include a sheet, a film, a foil, or the like. For example in some cases, ejecta barrier 428 may be between 25 and 5,000 micrometers thick. In some cases, ejecta barrier 428 may have a nominal thickness of about 2 mm. Alternatively or additionally, in some cases, ejecta barrier 428 may include rigid and/or structural elements, for instance which are solid. Rigid ejecta barriers 428 may include metals, composites and the like. In some cases, ejecta barrier 428 may be further configured to structurally support pouch cell 404. For example in some cases, pouch cell 404 may be mounted to a rigid ejecta barrier 428. Ejecta barrier 428 may configured to prevent ejecta from one pouch cell 404 from reaching another pouch cell. In some cases, ejecta may include hot matter, which if left uncontained could transfer heat to other, e.g., neighboring, pouch cells. By preventing hot ejecta from reaching pouch cells ejecta barrier 428 may aid in preventing progression of thermal runaway between battery cells within pouch cell 404. In some cases, ejecta may include combustible materials, which if left uncontained could settle upon other, e.g., neighboring, pouch cells. Combustible materials once combustion conditions are met may combust generating an exothermic reaction, which can induce thermal runaway on nearby battery cells. Combustion conditions can include presence of oxygen, fuel, spark, flash point, fire point, and/or autoignition temperature.

Still referring to FIG. 4, pouch cell 404 may include a vent 432. Vent 432 may provide for ejecta flow along a flow path 436. In some cases, vent 432 may be configured to vent cell ejecta from pouch cell 404. In some cases, at least a vent 432 may be configured to vent cell ejecta along a flow path 436. For example fluids such as gases liquids, or any material that acts as a gas or liquid, flowing along the flow path 436 may be cordoned away from contact with pouch cell 404. For example flow path 436 may be configured to not intersect with any surface of pouch cell 404. As a further non-limiting example, flow path 436 may be configured to extend from pouch cell 404 to an exterior location. As used in this disclosure an "exterior location" is a location and/or place that exists outside of stack battery pack. In an embodiment, and without limitation, exterior location may include a location and/or place that exists outside of an aircraft, wherein an aircraft is described below, in reference to FIG. 1. Flow path 436 may include any channel, tube, hose, conduit, or the like suitable for facilitating fluidic communication, for example with a pouch cell. In some cases, flow path 436 may include check valve 440. As used in this disclosure, a "check valve" is a valve that permits flow of a fluid only in certain, for example one, direction. In some cases check valve 440 may be configured to allow flow of fluids substantially only away from pouch cell 404 while preventing back flow of vented fluid to pouch cell 404. In some cases, check valve 440 may include a duckbill check valve. In some cases, a duckbill check valve may have lips which are substantially in a shape of a duckbill. Lips may be configured to open to allow forward flow (out of the lips), while remaining normally closed to prevent backflow (into the lips). In some cases, duckbill lips may be configured to automatically close (remain normally closed), for example with use of a compliant element, such as without limitation an elastomeric material, a spring, and the like. In some embodiments vent may include a mushroom poppet valve. In some cases, a mushroom poppet valve may include a mushroom shaped poppet. Mushroom shaped poppet may seal against a sealing element, for example a ring about an underside of a cap of the mushroom shaped poppet. In some cases, mushroom poppet valve may be loaded against sealing element, for example by way of a compliant element, such as a spring. According to some embodiments, vent 160 may have a vacuum applied to aid in venting of cell ejecta. Vacuum pressure differential may range from 0.1" Hg to 36" Hg. In some cases, vent 432 may be configured to provide fluidic communication through at least one of ejecta barrier 428 and/or pouch 420. In some cases, vent 432 may include a seam. Seam may be a seam of pouch 420. Alternatively or additionally; seam may be a seam of ejecta barrier 428. Vent may include a check valve 440. Check valve 440 may be configured to allow for a flow fluid in substantially one direction, for example away from pouch cell 404. In some cases, vent 432 may be configured to allow for a venting of ejecta from pouch cell 404 without substantially any flow of ejecta toward the pouch cell 404, for example from other battery cells.

Figure 5:
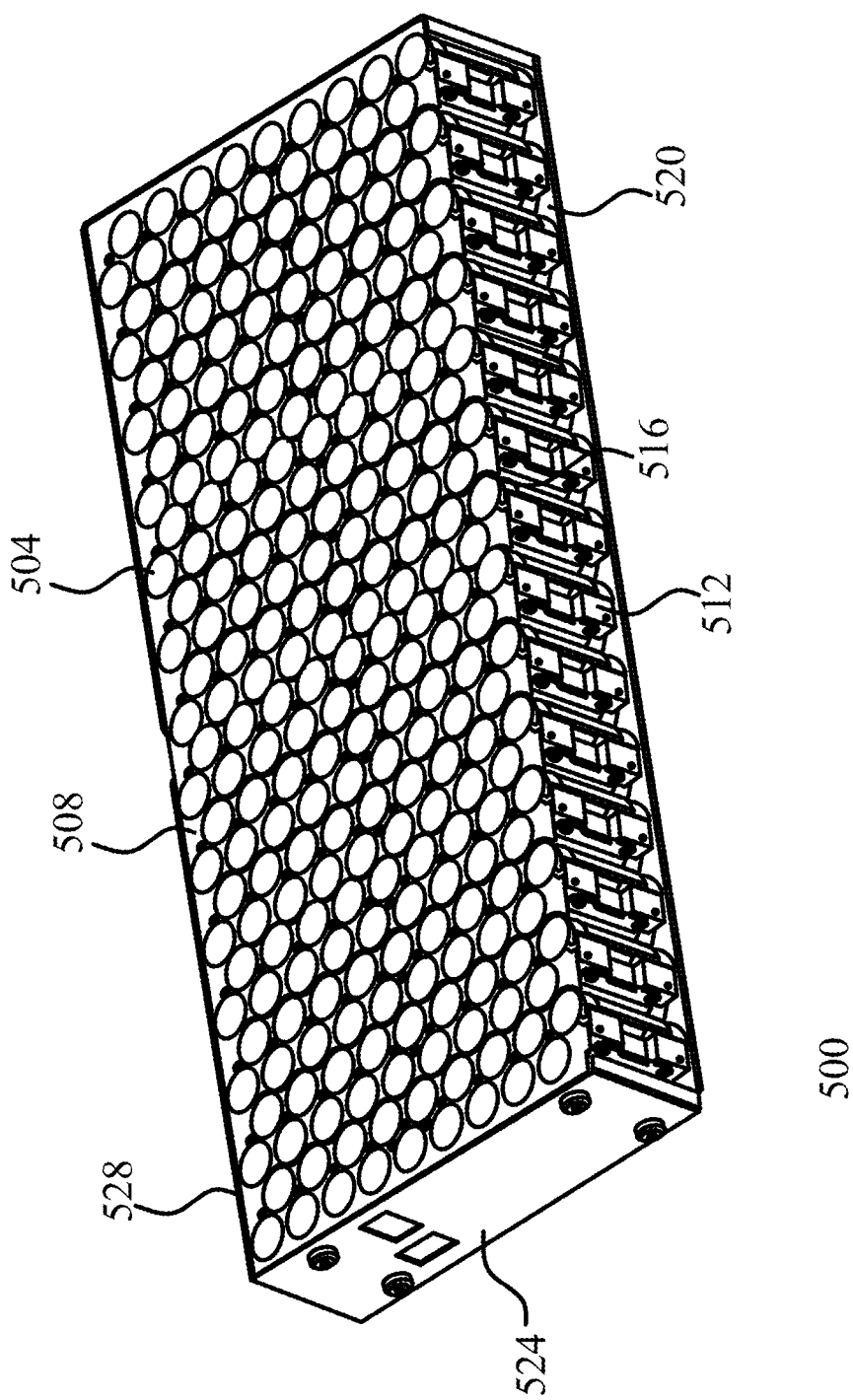
FIG. 5 is a diagrammatic representation of an exemplary embodiment of a battery module.

Still referring to FIG. 5, in embodiments, battery module 500 can include one or more battery cells 504. In another embodiment, battery module 500 comprises a plurality of individual battery cells 504. Battery cells 504 may each comprise a cell configured to include an electrochemical reaction that produces electrical energy sufficient to power at least a portion of an electric aircraft and/or a cart 100. Battery cell 504 may include electrochemical cells, galvanic cells, electrolytic cells, fuel cells, flow cells, voltaic cells, or any combination thereof—to name a few. In embodiments, battery cells 504 may be electrically connected in series, in parallel, or a combination of series and parallel. Series connection, as used herein, comprises wiring a first terminal of a first cell to a second terminal of a second cell and further configured to comprise a single conductive path for electricity to flow while maintaining the same current (measured in Amperes) through any component in the circuit. Battery cells 504 may use the term 'wired', but one of ordinary skill in the art would appreciate that this term is synonymous with 'electrically connected', and that there are many ways to couple electrical elements like battery cells 504 together. As an example, battery cells 504 can be coupled via prefabricated terminals of a first gender that mate with a second terminal with a second gender. Parallel connection, as used herein, comprises wiring a first and second terminal of a first battery cell to a first and second terminal of a second battery cell and further configured to comprise more than one conductive path for electricity to flow while maintaining the same voltage (measured in Volts) across any component in the circuit. Battery cells 504 may be wired in a series-parallel circuit which combines characteristics of the constituent circuit types to this combination circuit. Battery cells 504 may be electrically connected in any arrangement which may confer onto the system the electrical advantages associated with that arrangement such as high-voltage applications, high-current applications, or the like.

As used herein, an electrochemical cell is a device capable of generating electrical energy from chemical reactions or using electrical energy to cause chemical reactions. Further, voltaic or galvanic cells are electrochemical cells that generate electric current from chemical reactions, while electrolytic cells generate chemical reactions via electrolysis. As used herein, the term 'battery' is used as a collection of cells connected in series or parallel to each other.

According to embodiments and as discussed above, any two rows of battery cells 504 and therefore cell retainer 508 openings are shifted one half-length so that no two battery cells 504 are directly next to the next along the length of the battery module 500, this is the staggered arrangement presented in the illustrated embodiment of FIG. 5. Cell retainer 508 may employ this staggered arrangement to allow more cells to be disposed closer together than in square columns and rows like in a grid pattern. The staggered arrangement may also be configured to allow better thermodynamic dissipation, the methods of which may be further disclosed hereinbelow. Cell retainer 508 may comprise staggered openings that align with battery cells 504 and further configured to hold battery cells 504 in fixed positions. Cell retainer 508 may comprise an injection molded component. Injection molded component may comprise a component manufactured by injecting a liquid into a mold and letting it solidify, taking the shape of the mold in its hardened form. Cell retainer 508 may comprise liquid crystal polymer, polypropylene, polycarbonate, acrylonitrile butadiene styrene, polyethylene, nylon, polystyrene, polyether ether ketone, to name a few. Cell retainer 508 may comprise a second cell retainer fixed to the second end of battery cells 504 and configured to hold battery cells 504 in place from both ends. The second cell retainer may comprise similar or the exact same characteristics and functions of first cell retainer 508. Battery module 500 may also comprise cell guide 512. Cell guide 512 includes material disposed in between two rows of battery cells 504. In embodiments, cell guide 512 can be configured to distribute heat that may be generated by battery cells 504.

According to embodiments, battery module 500 may also comprise back plate 520. Back plate 520 is configured to provide a base structure for battery module 500 and may encapsulate at least a portion thereof. Backplate 520 can have any shape and includes opposite, opposing sides with a thickness between them. In embodiments, back plate 520 may comprise an effectively flat, rectangular prism shaped sheet. For example, back plate 520 can comprise one side of a larger rectangular prism which characterizes the shape of battery module 500 as a whole. Back plate 520 also comprises openings correlating to each battery cell 504 of the plurality of battery cells 504. Back plate 520 may comprise a lamination of multiple layers. The layers that are laminated together may comprise FR-4, a glass-reinforced epoxy laminate material, and a thermal barrier of a similar or exact same type as disclosed hereinabove. Back plate 520 may be configured to provide structural support and containment of at least a portion of battery module 500 as well as provide fire and thermal protection.

According to embodiments, battery module 500 may also comprise first end cap 524 configured to encapsulate at least a portion of battery module 500. End cap 524 may provide structural support for battery module 500 and hold back plate 520 in a fixed relative position compared to the overall battery module 500. End cap 524 may comprise a protruding boss on a first end that mates up with and snaps into a receiving feature on a first end of back plate 520. End cap 524 may comprise a second protruding boss on a second end that mates up with and snaps into a receiving feature on sense board.

Battery module 500 may also comprise at least a side panel 528 that may encapsulate two sides of battery module 500. Side panel 528 may comprise opposite and opposing faces comprising a metal or composite material. In the illustrative embodiment of FIG. 5, a second side panel 528 is present but not illustrated so that the inside of battery module 500 may be presented. Side panel(s) 528 may provide structural support for battery module 500 and provide a barrier to separate battery module 500 from exterior components within aircraft or environment.

In one or more embodiments, battery cells may include pouch cells. Pouch cells may include lithium (Li) ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon, tin nanocrystals, graphite, graphene or titanate anode, or the like. In one or more embodiments pouch cells may include lead-based batteries, such as without limitation, lead acid batteries and lead carbon batteries. Pouch cells may include lithium sulfur batteries, magnesium ion batteries, and/or sodium ion batteries. Battery module 104 may include, without limitation, batteries using nickel-based chemistries such as nickel cadmium or nickel metal hydride, batteries using lithium-ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), batteries using lithium polymer technology, metal-air batteries. Battery modules may include solid state batteries or supercapacitors or another suitable energy source. Battery module may be primary or secondary or a combination of both. Additional disclosure related to batteries and battery modules may be found in co-owned U.S. Patent Applications entitled "SYSTEM AND METHOD FOR HIGH ENERGY DENSITY BATTERY MODULE" and "SYSTEMS AND METHODS FOR RESTRICTING POWER TO A LOAD TO PREVENT ENGAGING CIRCUIT PROTECTION DEVICE FOR AN AIRCRAFT," having U.S. patent application Ser. Nos. 16/948,140 and 16/590,496 respectively; the entirety of both applications are incorporated herein by reference.

Figure 6:
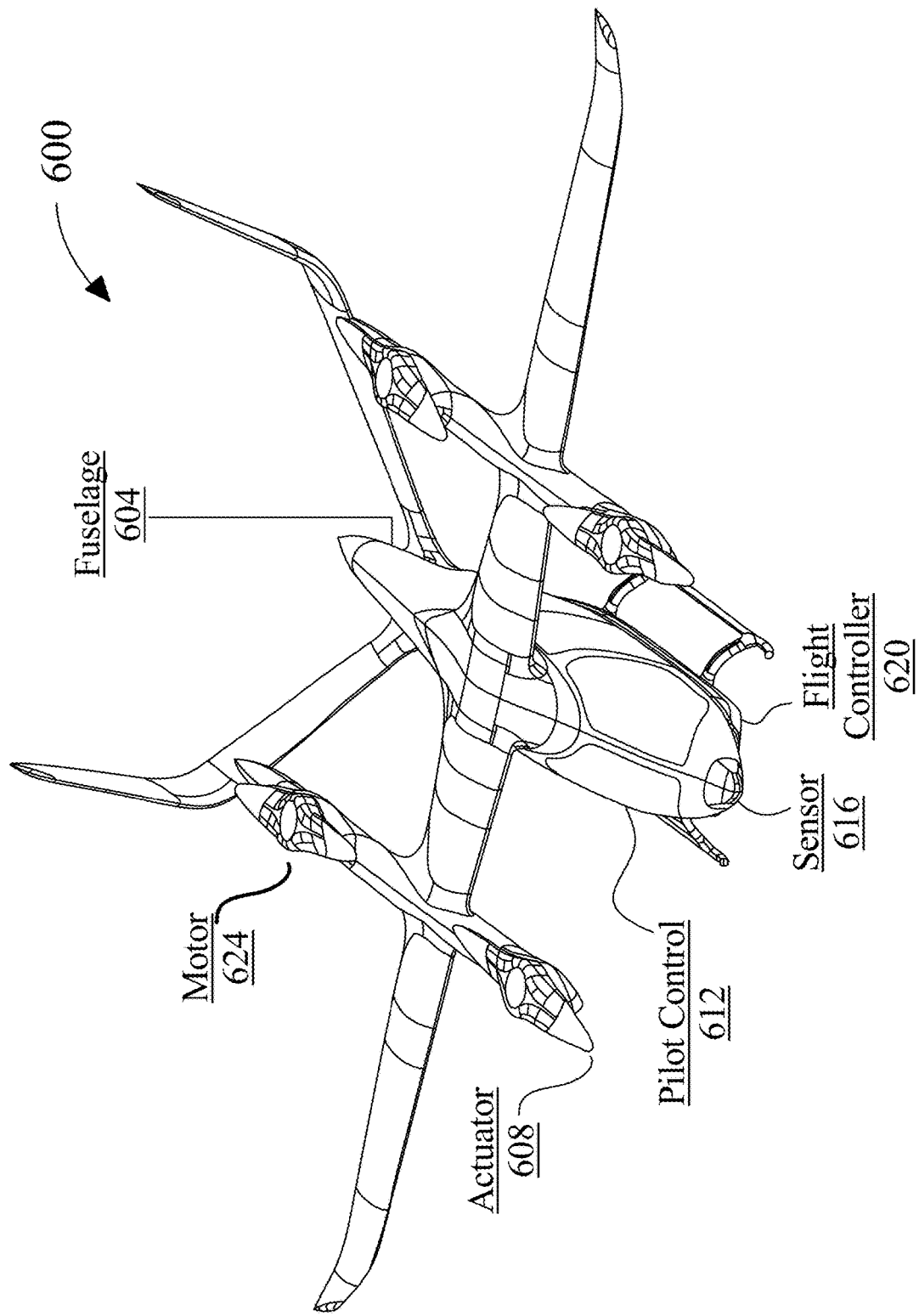
FIG. 6 is a diagrammatic representation illustrating an isometric view of an electric aircraft in accordance with aspects of the invention thereof.

Referring now to FIG. 6, an exemplary embodiment of an electric aircraft 600 which may be used in conjunction with system 100 of FIG. 1. Electric aircraft 600, and any of its features, may be used in conjunction with any of the embodiments of the present disclosure. Electric aircraft 600 may include any of the aircrafts as disclosed herein including electric aircraft 124 of FIG. 1. In an embodiment, electric aircraft 600 may be an electric vertical takeoff and landing (eVTOL) aircraft. As used in this disclosure, an "aircraft" is any vehicle that may fly by gaining support from the air. As a non-limiting example, aircraft may include airplanes, helicopters, commercial, personal and/or recreational aircrafts, instrument flight aircrafts, drones, electric aircrafts, airliners, rotorcrafts, vertical takeoff and landing aircrafts, jets, airships, blimps, gliders, paramotors, quadcopters, unmanned aerial vehicles (UAVs) and the like. As used in this disclosure, an "electric aircraft" is an electrically powered aircraft such as one powered by one or more electric motors or the like. In some embodiments, electrically powered (or electric) aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate the plane to a flight speed on takeoff and decelerate the plane after landing. In an embodiment, and without limitation, electric aircraft may be configured with an electric propulsion assembly. Including one or more propulsion and/or flight components. Electric propulsion assembly may include any electric propulsion assembly (or system) as described in U.S. Nonprovisional application Ser. No. 16/703,225, filed on Dec. 4, 2019, and entitled "AN INTEGRATED ELECTRIC PROPULSION ASSEMBLY," the entirety of which is incorporated herein by reference.

Still referring to FIG. 6, as used in this disclosure, a "vertical take-off and landing (VTOL) aircraft" is one that can hover, take off, and land vertically. An "electric vertical takeoff and landing aircraft" or "eVTOL aircraft," as used in this disclosure, is an electrically powered aircraft typically using an energy source, of a plurality of energy sources to power the aircraft. In order to optimize the power and energy necessary to propel the aircraft, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad copter," multi-rotor helicopter, or other vehicle that maintains its lift primarily using downward thrusting propulsors. "Fixed-wing flight," as described herein, is where the aircraft is capable of flight using wings and/or foils that generate lift caused by the aircraft's forward airspeed and the shape of the wings and/or foils, such as airplane-style flight.

Still referring to FIG. 6, electric aircraft 600, in some embodiments, may generally include a fuselage 604, a flight component 608 (or a plurality of flight components 608), a pilot control 620, an aircraft sensor 628 (or a plurality of aircraft sensors 628) and flight controller 152. In one embodiment, flight components 608 may include at least a lift component 612 (or a plurality of lift components 612) and at least a pusher component 616 (or a plurality of pusher components 616). Aircraft sensor(s) 628 may be the same as or similar to aircraft sensor(s) 160 of FIG. 1.

Still referring to FIG. 6, as used in this disclosure, a "fuselage" is the main body of an aircraft, or in other words, the entirety of the aircraft except for the cockpit, nose, wings, empennage, nacelles, any and all control surfaces, and generally contains an aircraft's payload. Fuselage 604 may include structural elements that physically support a shape and structure of an aircraft. Structural elements may take a plurality of forms, alone or in combination with other types. Structural elements may vary depending on a construction type of aircraft such as without limitation a fuselage 604. Fuselage 604 may comprise a truss structure. A truss structure may be used with a lightweight aircraft and comprises welded steel tube trusses. A "truss," as used in this disclosure, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber.

Still referring to FIG. 6, it should be noted that an illustrative embodiment is presented only, and this disclosure in no way limits the form or construction method of any of the aircrafts as disclosed herein. In embodiments, fuselage 604 may be configurable based on the needs of the aircraft per specific mission or objective. The general arrangement of components, structural elements, and hardware associated with storing and/or moving a payload may be added or removed from fuselage 604 as needed, whether it is stowed manually, automatedly, or removed by personnel altogether. Fuselage 604 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 604 may also be configurable to accept certain specific cargo containers, or a receptable that can, in turn, accept certain cargo containers.

Still referring to FIG. 6, electric aircraft 600 may include a plurality of laterally extending elements attached to fuselage 604. As used in this disclosure a "laterally extending element" is an element that projects essentially horizontally from fuselage, including an outrigger, a spar, and/or a fixed wing that extends from fuselage. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section geometry may comprise an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Laterally extending element may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground. In some embodiments, winglets may be provided at terminal ends of the wings which can provide improved aerodynamic efficiency and stability in certain flight situations. In some embodiments, the wings may be foldable to provide a compact aircraft profile, for example, for storage, parking and/or in certain flight modes.

Still referring to FIG. 6, electric aircraft 600 may include a plurality of flight components 608. As used in this disclosure a "flight component" is a component that promotes flight and guidance of an aircraft. Flight component 608 may include power sources, control links to one or more elements, fuses, and/or mechanical couplings used to drive and/or control any other flight component. Flight component 608 may include a motor that operates to move one or more flight control components, to drive one or more propulsors, or the like. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking. Flight component 608 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft.

Still referring to FIG. 6, in an embodiment, flight component 608 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 6, in an embodiment, plurality of flight components 608 of aircraft 600 may include at least a lift component 616 and at least a pusher component 616. Flight component 608 may include a propulsor, a propeller, a motor, rotor, a rotating element, electrical energy source, battery, and the like, among others. Each flight component may be configured to generate lift and flight of electric aircraft. In some embodiments, flight component 608 may include one or more lift components 612, one or more pusher components 616, one or more battery packs including one or more batteries or cells, and one or more electric motors. Flight component 608 may include a propulsor. As used in this disclosure a "propulsor component" or "propulsor" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight.

Still referring to FIG. 6, in some embodiments, lift component 612 may include a propulsor, a propeller, a blade, a motor, a rotor, a rotating element, an aileron, a rudder, arrangements thereof, combinations thereof, and the like. Each lift component 612, when a plurality is present, of plurality of flight components 608 is configured to produce, in an embodiment, substantially upward and/or vertical thrust such that aircraft moves upward.

With continued reference to FIG. 6, as used in this disclosure a "lift component" is a component and/or device used to propel a craft upward by exerting downward force on a fluid medium, which may include a gaseous medium such as air or a liquid medium such as water. Lift component 612 may include any device or component that consumes electrical power on demand to propel an electric aircraft in a direction or other vehicle while on ground or in-flight. For example, and without limitation, lift component 612 may include a rotor, propeller, paddle wheel and the like thereof, wherein a rotor is a component that produces torque along the longitudinal axis, and a propeller produces torque along the vertical axis. In an embodiment, lift component 612 includes a plurality of blades. As used in this disclosure a "blade" is a propeller that converts rotary motion from an engine or other power source into a swirling slipstream. In an embodiment, blade may convert rotary motion to push the propeller forwards or backwards. In an embodiment lift component 612 may include a rotating power-driven hub, to which are attached several radial airfoil-section blades such that the whole assembly rotates about a longitudinal axis. Blades may be configured at an angle of attack. In an embodiment, and without limitation, angle of attack may include a fixed angle of attack. As used in this disclosure a "fixed angle of attack" is fixed angle between a chord line of a blade and relative wind. As used in this disclosure a "fixed angle" is an angle that is secured and/or unmovable from the attachment point. In an embodiment, and without limitation, angle of attack may include a variable angle of attack. As used in this disclosure a "variable angle of attack" is a variable and/or moveable angle between a chord line of a blade and relative wind. As used in this disclosure a "variable angle" is an angle that is moveable from an attachment point. In an embodiment, angle of attack be configured to produce a fixed pitch angle. As used in this disclosure a "fixed pitch angle" is a fixed angle between a cord line of a blade and the rotational velocity direction. In an embodiment fixed angle of attack may be manually variable to a few set positions to adjust one or more lifts of the aircraft prior to flight. In an embodiment, blades for an aircraft are designed to be fixed to their hub at an angle similar to the thread on a screw makes an angle to the shaft; this angle may be referred to as a pitch or pitch angle which will determine a speed of forward movement as the blade rotates.

In an embodiment, and still referring to FIG. 6, lift component 612 may be configured to produce a lift. As used in this disclosure a "lift" is a perpendicular force to the oncoming flow direction of fluid surrounding the surface. For example, and without limitation relative air speed may be horizontal to the aircraft, wherein lift force may be a force exerted in a vertical direction, directing the aircraft upwards. In an embodiment, and without limitation, lift component 612 may produce lift as a function of applying a torque to lift component. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, one or more flight components 608 such as a power source(s) may apply a torque on lift component 612 to produce lift.

In an embodiment and still referring to FIG. 6, a plurality of lift components 612 of plurality of flight components 608 may be arranged in a quad copter orientation. As used in this disclosure a "quad copter orientation" is at least a lift component oriented in a geometric shape and/or pattern, wherein each of the lift components is located along a vertex of the geometric shape. For example, and without limitation, a square quad copter orientation may have four lift propulsor components oriented in the geometric shape of a square, wherein each of the four lift propulsor components are located along the four vertices of the square shape. As a further non-limiting example, a hexagonal quad copter orientation may have six lift components oriented in the geometric shape of a hexagon, wherein each of the six lift components are located along the six vertices of the hexagon shape. In an embodiment, and without limitation, quad copter orientation may include a first set of lift components and a second set of lift components, wherein the first set of lift components and the second set of lift components may include two lift components each, wherein the first set of lift components and a second set of lift components are distinct from one another. For example, and without limitation, the first set of lift components may include two lift components that rotate in a clockwise direction, wherein the second set of lift propulsor components may include two lift components that rotate in a counterclockwise direction. In an embodiment, and without limitation, the first set of lift components may be oriented along a line oriented 45° from the longitudinal axis of aircraft 600. In another embodiment, and without limitation, the second set of lift components may be oriented along a line oriented 135° from the longitudinal axis, wherein the first set of lift components line and the second set of lift components are perpendicular to each other.

Still referring to FIG. 6, pusher component 616 and lift component 612 (of flight component(s) 608) may include any such components and related devices as disclosed in U.S. Nonprovisional application Ser. No. 16/427,298, filed on May 30, 2019, entitled "SELECTIVELY DEPLOYABLE HEATED PROPULSOR SYSTEM,", U.S. Nonprovisional application Ser. No. 16/703,225, filed on Dec. 4, 2019, entitled "AN INTEGRATED ELECTRIC PROPULSION ASSEMBLY,", U.S. Nonprovisional application Ser. No. 16/910,255, filed on Jun. 24, 2020, entitled "AN INTEGRATED ELECTRIC PROPULSION ASSEMBLY,", U.S. Nonprovisional application Ser. No. 17/319,155, filed on May 13, 2021, entitled "AIRCRAFT HAVING REVERSE THRUST CAPABILITIES,", U.S. Nonprovisional application Ser. No. 16/929,206, filed on Jul. 15, 2020, entitled "A HOVER AND THRUST CONTROL ASSEMBLY FOR DUAL-MODE AIRCRAFT,", U.S. Nonprovisional application Ser. No. 17/001,845, filed on Aug. 25, 2020, entitled "A HOVER AND THRUST CONTROL ASSEMBLY FOR DUAL-MODE AIRCRAFT,", U.S. Nonprovisional application Ser. No. 17/186,079, filed on Feb. 26, 2021, entitled "METHODS AND SYSTEM FOR ESTIMATING PERCENTAGE TORQUE PRODUCED BY A PROPULSOR CONFIGURED FOR USE IN AN ELECTRIC AIRCRAFT,", and U.S. Nonprovisional application Ser. No. 17/321,662, filed on May 17, 2021, entitled "AIRCRAFT FOR FIXED PITCH LIFT,", the entirety of each one of which is incorporated herein by reference. Any aircrafts, including electric and eVTOL aircrafts, as disclosed in any of these applications may efficaciously be utilized with any of the embodiments as disclosed herein, as needed, or desired. Any flight controllers as disclosed in any of these applications may efficaciously be utilized with any of the embodiments as disclosed herein, as needed, or desired.

Still referring to FIG. 6, pusher component 616 may include a propulsor, a propeller, a blade, a motor, a rotor, a rotating element, an aileron, a rudder, arrangements thereof, combinations thereof, and the like. Each pusher component 616, when a plurality is present, of the plurality of flight components 608 is configured to produce, in an embodiment, substantially forward and/or horizontal thrust such that the aircraft moves forward.

Still referring to FIG. 6, as used in this disclosure a "pusher component" is a component that pushes and/or thrusts an aircraft through a medium. As a non-limiting example, pusher component 616 may include a pusher propeller, a paddle wheel, a pusher motor, a pusher propulsor, and the like. Additionally, or alternatively, pusher flight component may include a plurality of pusher flight components. Pusher component 616 is configured to produce a forward thrust. As a non-limiting example, forward thrust may include a force-to-force aircraft to in a horizontal direction along the longitudinal axis. As a further non-limiting example, pusher component 616 may twist and/or rotate to pull air behind it and, at the same time, push aircraft 600 forward with an equal amount of force. In an embodiment, and without limitation, the more air forced behind aircraft, the greater the thrust force with which the aircraft is pushed horizontally will be. In another embodiment, and without limitation, forward thrust may force aircraft 600 through the medium of relative air. Additionally or alternatively, plurality of flight components 608 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Still referring to FIG. 6, as used in this disclosure a "power source" is a source that powers, drives and/or controls any flight component and/or other aircraft component. For example, and without limitation power source may include a motor that operates to move one or more lift components 612 and/or one or more pusher components 616, to drive one or more blades, or the like thereof. Motor(s) may be driven by direct current (DC) electric power and may include, without limitation, brushless DC electric motors, switched reluctance motors, induction motors, or any combination thereof. Motor(s) may also include electronic speed controllers or other components for regulating motor speed, rotation direction, and/or dynamic braking. A "motor" as used in this disclosure is any machine that converts non-mechanical energy into mechanical energy. An "electric motor" as used in this disclosure is any machine that converts electrical energy into mechanical energy.

Still referring to FIG. 6, in an embodiment, aircraft 600 may include a pilot control 620. As used in this disclosure, a "pilot control" is a mechanism or means which allows a pilot to monitor and control operation of aircraft such as its flight components (for example, and without limitation, pusher component, lift component and other components such as propulsion components). For example, and without limitation, pilot control 620 may include a collective, inceptor, foot bake, steering and/or control wheel, control stick, pedals, throttle levers, and the like. Pilot control 620 may be configured to translate a pilot's desired torque for each flight component of the plurality of flight components, such as and without limitation, pusher component 616 and lift component 612. Pilot control 620 may be configured to control, via inputs and/or signals such as from a pilot, the pitch, roll, and yaw of the aircraft. Pilot control may be available onboard aircraft or remotely located from it, as needed or desired.

Still referring to FIG. 6, as used in this disclosure a "collective control" or "collective" is a mechanical control of an aircraft that allows a pilot to adjust and/or control the pitch angle of plurality of flight components 608. For example and without limitation, collective control may alter and/or adjust the pitch angle of all of the main rotor blades collectively. For example, and without limitation pilot control 620 may include a yoke control. As used in this disclosure a "yoke control" is a mechanical control of an aircraft to control the pitch and/or roll. For example and without limitation, yoke control may alter and/or adjust the roll angle of aircraft 600 as a function of controlling and/or maneuvering ailerons. In an embodiment, pilot control 620 may include one or more footbrakes, control sticks, pedals, throttle levels, and the like thereof. In another embodiment, and without limitation, pilot control 620 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of aircraft, perpendicular to the wings. For example, and without limitation, a positive yawing motion may include adjusting and/or shifting nose of aircraft 600 to the right. Principal axis may include a pitch axis. As used in this disclosure a "pitch axis" is an axis that is directed towards the right laterally extending wing of aircraft. For example, and without limitation, a positive pitching motion may include adjusting and/or shifting nose of aircraft 600 upwards. Principal axis may include a roll axis. As used in this disclosure a "roll axis" is an axis that is directed longitudinally towards nose of aircraft, parallel to fuselage. For example, and without limitation, a positive rolling motion may include lifting the left and lowering the right wing concurrently. Pilot control 620 may be configured to modify a variable pitch angle. For example, and without limitation, pilot control 620 may adjust one or more angles of attack of a propulsor or propeller.

Still referring to FIG. 6, aircraft 600 may include at least an aircraft sensor 628. Aircraft sensor 628 may include any sensor or noise monitoring circuit described in this disclosure. Aircraft sensor 628, in some embodiments, may be communicatively connected or coupled to flight controller 152. Aircraft sensor 628 may be configured to sense a characteristic of pilot control 620. Sensor may be a device, module, and/or subsystem, utilizing any hardware, software, and/or any combination thereof to sense a characteristic and/or changes thereof, in an instant environment, for instance without limitation a pilot control 620, which the sensor is proximal to or otherwise in a sensed communication with, and transmit information associated with the characteristic, for instance without limitation digitized data. Sensor 628 may be mechanically and/or communicatively coupled to aircraft 600, including, for instance, to at least a pilot control 620. Aircraft sensor 628 may be configured to sense a characteristic associated with at least a pilot control 620. An environmental sensor may include without limitation one or more sensors used to detect ambient temperature, barometric pressure, and/or air velocity. Aircraft sensor 628 may include without limitation gyroscopes, accelerometers, inertial measurement unit (IMU), and/or magnetic sensors, one or more humidity sensors, one or more oxygen sensors, or the like. Additionally or alternatively, sensor 628 may include at least a geospatial sensor. Aircraft sensor 628 may be located inside aircraft, and/or be included in and/or attached to at least a portion of aircraft. Sensor may include one or more proximity sensors, displacement sensors, vibration sensors, and the like thereof. Sensor may be used to monitor the status of aircraft 600 for both critical and non-critical functions. Sensor may be incorporated into vehicle or aircraft or be remote.

Still referring to FIG. 6, in some embodiments, aircraft sensor 628 may be configured to sense a characteristic associated with any pilot control described in this disclosure. Non-limiting examples of aircraft sensor 628 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, aircraft sensor 628 may sense a characteristic as an analog measurement, for instance, yielding a continuously variable electrical potential indicative of the sensed characteristic. In these cases, aircraft sensor 628 may additionally comprise an analog to digital converter (ADC) as well as any additionally circuitry, such as without limitation a Wheatstone bridge, an amplifier, a filter, and the like. For instance, in some cases, aircraft sensor 628 may comprise a strain gage configured to determine loading of one or more aircraft components, for instance landing gear. Strain gage may be included within a circuit comprising a Wheatstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 600, for instance without limitation a computing system, a pilot display, and a memory component. Alternatively or additionally, aircraft sensor 628 may sense a characteristic of a pilot control 620 digitally. For instance in some embodiments, aircraft sensor 628 may sense a characteristic through a digital means or digitize a sensed signal natively. In some cases, for example, aircraft sensor 628 may include a rotational encoder and be configured to sense a rotational position of a pilot control; in this case, the rotational encoder digitally may sense rotational "clicks" by any known method, such as without limitation magnetically, optically, and the like. Aircraft sensor 628 may include any of the sensors as disclosed in the present disclosure. Aircraft sensor 628 may include a plurality of sensors. Any of these sensors may be located at any suitable position in or on aircraft 600.

With continued reference to FIG. 6, in some embodiments, electric aircraft 600 includes, or may be coupled to or communicatively connected to, flight controller 152 which is described further with reference to FIG. 3. As used in this disclosure a "flight controller" is a computing device of a plurality of computing devices dedicated to data storage, security, distribution of traffic for load balancing, and flight instruction. In embodiments, flight controller may be installed in an aircraft, may control the aircraft remotely, and/or may include an element installed in the aircraft and a remote element in communication therewith. Flight controller 152, in an embodiment, is located within fuselage 604 of aircraft. In accordance with some embodiments, flight controller is configured to operate a vertical lift flight (upwards or downwards, that is, takeoff or landing), a fixed wing flight (forward or backwards), a transition between a vertical lift flight and a fixed wing flight, and a combination of a vertical lift flight and a fixed wing flight.

Still referring to FIG. 6, in an embodiment, and without limitation, flight controller 152 may be configured to operate a fixed-wing flight capability. A "fixed-wing flight capability" can be a method of flight wherein the plurality of laterally extending elements generate lift. For example, and without limitation, fixed-wing flight capability may generate lift as a function of an airspeed of aircraft 600 and one or more airfoil shapes of the laterally extending elements. As a further non-limiting example, flight controller 152 may operate the fixed-wing flight capability as a function of reducing applied torque on lift (propulsor) component 612. In an embodiment, and without limitation, an amount of lift generation may be related to an amount of forward thrust generated to increase airspeed velocity, wherein the amount of lift generation may be directly proportional to the amount of forward thrust produced. Additionally or alternatively, flight controller may include an inertia compensator. As used in this disclosure an "inertia compensator" is one or more computing devices, electrical components, logic circuits, processors, and the like there of that are configured to compensate for inertia in one or more lift (propulsor) components present in aircraft 100. Inertia compensator may alternatively or additionally include any computing device used as an inertia compensator as described in U.S. Nonprovisional application Ser. No. 17/106,557, filed on Nov. 30, 2020, and entitled "SYSTEM AND METHOD FOR FLIGHT CONTROL IN ELECTRIC AIRCRAFT," the entirety of which is incorporated herein by reference. Flight controller 152 may efficaciously include any flight controllers as disclosed in U.S. Nonprovisional application Ser. No. 17/106,557, filed on Nov. 30, 2020, and entitled "SYSTEM AND METHOD FOR FLIGHT CONTROL IN ELECTRIC AIRCRAFT."

In an embodiment, and still referring to FIG. 6, flight controller 152 may be configured to perform a reverse thrust command. As used in this disclosure a "reverse thrust command" is a command to perform a thrust that forces a medium towards the relative air opposing aircraft 100. Reverse thrust command may alternatively or additionally include any reverse thrust command as described in U.S. Nonprovisional application Ser. No. 17/319,155, filed on May 13, 2021, and entitled "AIRCRAFT HAVING REVERSE THRUST CAPABILITIES," the entirety of which is incorporated herein by reference. In another embodiment, flight controller may be configured to perform a regenerative drag operation. As used in this disclosure a "regenerative drag operation" is an operating condition of an aircraft, wherein the aircraft has a negative thrust and/or is reducing in airspeed velocity. For example, and without limitation, regenerative drag operation may include a positive propeller speed and a negative propeller thrust. Regenerative drag operation may alternatively or additionally include any regenerative drag operation as described in U.S. Nonprovisional application Ser. No. 17/319,155. Flight controller 152 may efficaciously include any flight controllers as disclosed in U.S. Nonprovisional application Ser. No. 17/319,155, filed on May 13, 2021, and entitled "AIRCRAFT HAVING REVERSE THRUST CAPABILITIES,".

In an embodiment, and still referring to FIG. 6, flight controller 152 may be configured to perform a corrective action as a function of a failure event. As used in this disclosure a "corrective action" is an action conducted by the plurality of flight components to correct and/or alter a movement of an aircraft. For example, and without limitation, a corrective action may include an action to reduce a yaw torque generated by a failure event. Additionally or alternatively, corrective action may include any corrective action as described in U.S. Nonprovisional application Ser. No. 17/222,539, filed on Apr. 5, 2021, and entitled "AIRCRAFT FOR SELF-NEUTRALIZING FLIGHT," the entirety of which is incorporated herein by reference. As used in this disclosure a "failure event" is a failure of a lift component of the plurality of lift components. For example, and without limitation, a failure event may denote a rotation degradation of a rotor, a reduced torque of a rotor, and the like thereof. Additionally or alternatively, failure event may include any failure event as described in U.S. Nonprovisional application Ser. No. 17/113,647, filed on Dec. 7, 2020, and entitled "IN-FLIGHT STABILIZATION OF AN AIRCRAFT," the entirety of which is incorporated herein by reference. Flight controller 152 may efficaciously include any flight controllers as disclosed in U.S. Nonprovisional application. Ser. Nos. 17/222,539 and 17/113,647.

Figure 7:
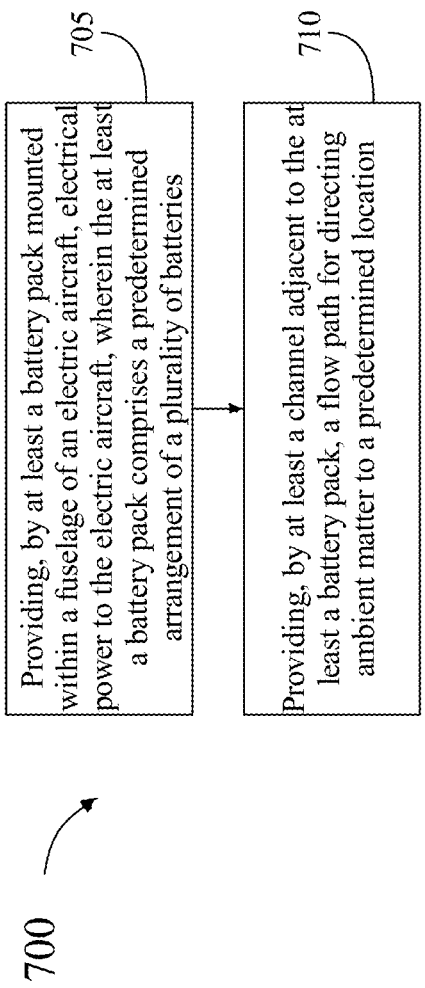
FIG. 7 is a diagrammatic representation of exemplary method of use for a system for battery environment management in an electric aircraft.

Referring now to FIG. 7, an exemplary method 700 for battery environment management in an electric aircraft. An electric vehicle may include any electric vehicle described in this disclosure, for example with reference to FIGS. 1-8. At step 705, method 700 providing, by at least a battery pack mounted within a fuselage of an electric aircraft, electrical power to the electric aircraft, wherein the at least a battery pack comprises a predetermined arrangement of a plurality of batteries. A battery pack may include any battery described in this disclosure, for example with reference to FIGS. 1-8.

At step 710, method 700 providing, by at least a channel adjacent to the at least a battery pack, a flow path for directing battery ejecta to a predetermined location. A channel may include any channel described in this disclosure, for example with reference to FIGS. 1-8. Battery ejecta may include any liquid, gas, or heat described in this disclosure, for example with reference to FIGS. 1-8.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
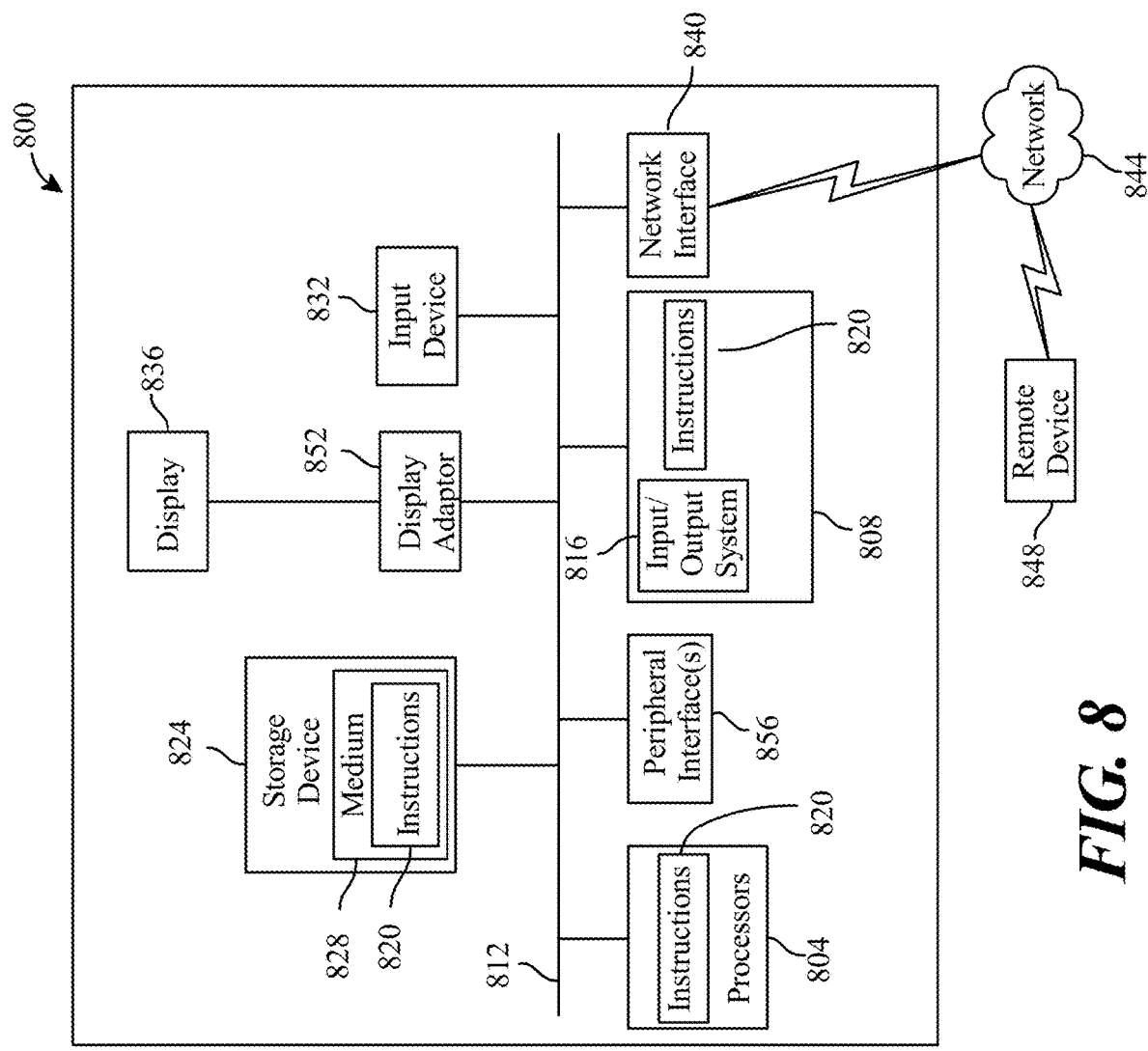
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for battery environment management in an electric aircraft, the system comprising:
at least a battery pack mounted within a fuselage of an electric aircraft and configured to provide electrical power to the electric aircraft, wherein the at least a battery pack comprises an arrangement of a plurality of battery cells, wherein at least a battery cell of the plurality of battery cells comprises a flexible pouch containing an electrolyte;

an outlet vent; and at least a channel, wherein the at least a channel is configured to provide a flow path for directing battery ejecta from the at least a battery cell of the plurality of battery cells to the outlet vent.

2. The system of claim 1, wherein the plurality of battery cells comprises at least a lithium ion battery.

3. The system of claim 1, wherein the at least a channel is further configured to provide thermal control for the at least a battery pack.

4. The system of claim 1, wherein the at least a channel is configured to direct ejecta from at least a lithium metal battery cell.

5. The system of claim 1, wherein the system further comprises controlling a flow of the battery ejecta through the at least a channel by a pump.

6. The system of claim 1, wherein the system further comprises a valve in fluid communication with the at least a channel.

7. The system of claim 1, wherein the system further comprises a plurality of battery packs and a plurality of channels.

8. The system of claim 1, wherein the system further comprises a manifold in fluid communication with the at least a channel.

9. A method for battery environment management in an electric aircraft, the method comprising:

providing, by at least a battery pack mounted within a fuselage of an electric aircraft, electrical power to the electric aircraft, wherein the at least a battery pack comprises an arrangement of a plurality of battery cells, wherein at least a battery cell of the plurality of battery cells comprises a flexible pouch containing an electrolyte; and providing, by at least a channel, a flow path for directing battery ejecta from the at least a battery cell of the plurality of battery cells to an outlet vent.

10. The method of claim 9, wherein the plurality of battery cells comprises at least a lithium ion battery.

11. The method of claim 9, wherein the at least a channel is further configured to provide thermal control for the at least a battery pack.

12. The method of claim 9, wherein the at least a channel is configured to direct ejecta from at least a lithium metal battery cell.

13. The method of claim 9, wherein the method further comprises controlling a flow of the battery ejecta through the at least a channel by a pump.

14. The method of claim 9, wherein the method further comprises a valve in fluid communication with the at least a channel.

15. The method of claim 9, wherein the method further comprises a plurality of battery packs and a plurality of channels.

16. The method of claim 9, wherein the method further comprises a manifold in fluid communication with the at least a channel.

17. The system of claim 1, wherein the system further comprises four independent sensors to detect battery pack parameters.

18. The system of claim 1, wherein an outer surface of the flexible pouch is coated with a metalizing coating.

19. The system of claim 18, wherein the at least a battery cell includes a pair of conductive foil tabs.

20. The system of claim 19, wherein the at least a battery cell includes an ejecta barrier configured to impede passage of the battery ejecta.

* * * * *